US012627073B2

(12) United States Patent
Yun et al.

(10) Patent No.: US 12,627,073 B2
(45) Date of Patent: May 12, 2026

(54) ANTENNA STRUCTURE INCLUDING PHASE SHIFTER AND ELECTRONIC DEVICE INCLUDING SAME

(71) Applicant: Samsung Electronics Co., Ltd., Suwon-si (KR)

(72) Inventors: Sumin Yun, Suwon-si (KR); Hosaeng Kim, Suwon-si (KR); Seongjin Park, Suwon-si (KR); Woomin Jang, Suwon-si (KR); Jehun Jong, Suwon-si (KR); Jaehoon Jo, Suwon-si (KR); Jinwoo Jung, Suwon-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 18/485,849

(22) Filed: Oct. 12, 2023

(65) Prior Publication Data

US 2024/0039171 A1 Feb. 1, 2024

Related U.S. Application Data

(63) Continuation of application No. PCT/KR2022/004885, filed on Apr. 5, 2022.

(30) Foreign Application Priority Data

Apr. 12, 2021 (KR) ........................ 10-2021-0046995

(51) Int. Cl.
*H01Q 21/06* (2006.01)
*H01Q 1/22* (2006.01)
(Continued)

(52) U.S. Cl.
CPC ......... *H01Q 21/065* (2013.01); *H01Q 1/2208* (2013.01); *H01Q 3/36* (2013.01); *H01Q 9/0407* (2013.01); *H01Q 9/0421* (2013.01)

(58) Field of Classification Search
CPC .. H01Q 21/065; H01Q 1/2208; H01Q 9/0421; H01Q 9/0457; H01Q 1/241;
(Continued)

(56) References Cited

U.S. PATENT DOCUMENTS

| | | | |
|---|---|---|---|
| 10,693,216 | B1 | 6/2020 | Ryu et al. |
| 11,171,406 | B2 | 11/2021 | Yun et al. |

(Continued)

FOREIGN PATENT DOCUMENTS

| | | | |
|---|---|---|---|
| CN | 104078769 | B | 6/2017 |
| CN | 110998972 | A | 4/2020 |

(Continued)

OTHER PUBLICATIONS

European Search Report dated Aug. 8, 2024, issued in European Application No. 22788326.1.

(Continued)

*Primary Examiner* — Dameon E Levi
*Assistant Examiner* — Yonchan J Kim
(74) *Attorney, Agent, or Firm* — Jefferson IP Law, LLP

(57) ABSTRACT

An antenna structure is provided. The antenna structure includes a PCB including a first surface and a second surface facing in an opposite direction to the first surface, a conductive patch disposed on the first surface or inside the PCB so as to be adjacent to the first surface rather than the second surface, a first via passing through at least a section of the PCB and connected to the conductive patch and a second via spaced apart from the first via and connected to the conductive patch, a radio frequency integrated circuit (RFIC) disposed on the second surface, and a phase shifter disposed on the second surface or the conductive patch and electrically connected to the RFIC, or disposed inside the RFIC, (Continued)

wherein the conductive patch may be connected to the RFIC through the first and may be connected to the phase shifter through the second via.

11 Claims, 18 Drawing Sheets

(51) Int. Cl.
*H01Q 3/36* (2006.01)
*H01Q 9/04* (2006.01)

(58) Field of Classification Search
CPC ...... H01Q 5/35; H01Q 9/0442; H01Q 9/0407; H01Q 3/36
See application file for complete search history.

(56) References Cited

U.S. PATENT DOCUMENTS

| | | | | |
|---|---|---|---|---|
| 2011/0080330 | A1 | 4/2011 | Lee et al. | |
| 2011/0122037 | A1 | 5/2011 | Rofougaran et al. | |
| 2014/0203982 | A1 | 7/2014 | Seo et al. | |
| 2014/0320376 | A1 | 10/2014 | Ozdemir | |
| 2018/0175476 | A1 | 6/2018 | Teshiba et al. | |
| 2019/0363453 | A1 | 11/2019 | Yu et al. | |
| 2019/0386397 | A1 | 12/2019 | Son et al. | |
| 2020/0021019 | A1* | 1/2020 | Rajagopalan | H01Q 1/2291 |
| 2020/0106181 | A1 | 4/2020 | Avser et al. | |
| 2020/0106508 | A1 | 4/2020 | Raghavan et al. | |
| 2020/0153947 | A1 | 5/2020 | Hwang et al. | |
| 2020/0266519 | A1 | 8/2020 | Lee et al. | |
| 2020/0303833 | A1 | 9/2020 | Ueda | |
| 2020/0321998 | A1 | 10/2020 | Ezz et al. | |
| 2020/0381828 | A1 | 12/2020 | Li et al. | |
| 2021/0021024 | A1 | 1/2021 | Park et al. | |
| 2021/0234269 | A1* | 7/2021 | Vilenskiy | H01Q 3/46 |
| 2022/0045428 | A1 | 2/2022 | Sudo | |

FOREIGN PATENT DOCUMENTS

| | | | | |
|---|---|---|---|---|
| EP | 3748774 | A1 * | 12/2020 | H01Q 1/38 |
| EP | 3 817 144 | B1 | 2/2024 | |
| JP | 2018-157533 | A | 10/2018 | |
| KR | 10-1574571 | B1 | 12/2015 | |
| KR | 10-2019-0045941 | A | 5/2019 | |
| KR | 10-2019-0088923 | A | 7/2019 | |
| KR | 10-2003710 | B1 | 7/2019 | |
| KR | 10-2019-0134435 | A | 12/2019 | |
| KR | 10-2019-0142827 | A | 12/2019 | |
| KR | 10-2045483 | B1 | 12/2019 | |
| KR | 10-2020-0101814 | A | 8/2020 | |
| KR | 10-2021-0009531 | A | 1/2021 | |
| WO | 2020/014874 | A1 | 1/2020 | |
| WO | WO-2020040624 | A1 * | 2/2020 | H01Q 21/064 |
| WO | 2020/217689 | A1 | 10/2020 | |

OTHER PUBLICATIONS

International Search Report dated Aug. 1, 2022, issued in International Application No. PCT/KR2022/004885.

European Search Report dated Dec. 2, 2024, issued in European Application No. 22788326.1.

Saudi Arabian Office Action dated Jan. 17, 2024, issued in Saudi Arabian Application No. 523451064.

Korean Office Action dated May 1, 2025, issued in Korean Application No. 10-2021-0046995.

Korean Office Action Dated Jan. 5, 2026, issued in Korean Application No. 10-2021-0046995.

* cited by examiner

ANTENNA STRUCTURE INCLUDING PHASE SHIFTER AND ELECTRONIC DEVICE INCLUDING SAME

CROSS-REFERENCE TO RELATED APPLICATION(S)

This application is a continuation application, claiming priority under § 365(c), of an International application No. PCT/KR2022/004885, filed on Apr. 5, 2022, which is based on and claims the benefit of a Korean patent application number 10-2021-0046995, filed on Apr. 12, 2021, in the Korean Intellectual Property Office, the disclosure of which is incorporated by reference herein in its entirety.

BACKGROUND

1. Field

The disclosure relates to an antenna structure including a phase shifter and an electronic device including the same.

2. Description of Related Art

Efforts to develop $5^{th}$ generation (5G) communication systems or pre-5G communication systems have been ongoing in order to meet the increasing demand for wireless data traffic since $4^{th}$ generation (4G) communication systems were commercialized.

The 5G communication system is considered to be implemented in a high frequency (mmWave) band (e.g., 20 GHz to about 300 GHz) to achieve a high data transmission rate. For the 5G communication systems, technologies for beam-forming, massive multiple input multiple output (MIMO), full dimensional MIMO (FD-MIMO), array antenna, analog beam-forming, and/or large scale antenna are being discussed to mitigate a path loss of a radio wave and to increase a transmission distance of a radio wave in a high frequency band.

In addition, a switch or tuners may be used in an electronic device to adjust a frequency of an antenna which supports 4G communication. As a method for adjusting a frequency of an antenna, an impedance tuning method for adjusting input impedance of an antenna, or an aperture tuning method for changing a current path of an antenna by controlling connection at a specific position may be used.

The above information is presented as background information only to assist with an understanding of the disclosure. No determination has been made, and no assertion is made, as to whether any of the above might be applicable as prior art with regard to the disclosure.

SUMMARY

Since a signal of a high frequency (e.g., about 20 GHz to 300 GHz) such as mmWave has a very short wavelength, the transmission line effect caused by a line length from an antenna to a switch or tuner may be great. Due to such a transmission line effect, the frequency of the antenna may be greatly changed or a tuning effect may be reduced.

In order to reduce the transmission line effect, the length of the line connected from the antenna to the switch or tuner should be set to a specific distance. Due to the characteristics of an mmWave antenna module including a plurality of antenna radiators, such restrictions may increase complexity of design and arrangement of an antenna and an antenna module.

Aspects of the disclosure are to address at least the above-mentioned problems and/or disadvantages and to provide at least the advantages described below. Accordingly, an aspect of the disclosure is to provide an antenna structure that adjusts a frequency of a signal transmitted or received through an antenna by connecting an antenna radiator and a phase shifter disposed in the antenna structure.

Additional aspects will be set forth in part in the description which follows and, in part, will be apparent from the description, or may be learned by practice of the presented embodiments.

In accordance with an aspect of the disclosure, an antenna structure is provided. The antenna structure includes a printed circuit board (PCB) which includes a first surface and a second surface facing in an opposite direction to the first surface, a conductive patch which is disposed on the first surface or inside the PCB adjacent to the first surface rather than the second surface, a first via which penetrates through at least part of the PCB and is connected with the conductive patch, a second via which is spaced apart from the first via and is connected with the conductive patch, a radio frequency integrated circuit (RFIC) which is disposed on the second surface, and a phase shifter which is disposed on the second surface or on the conductive patch to be electrically connected with the RFIC, or is disposed inside the RFIC, wherein the conductive patch is connected with the RFIC through the first via, and is connected with the phase shifter through the second via.

In accordance with another aspect of the disclosure, an electronic device is provided. The electronic device includes at least one processor which is disposed in the electronic device, and an antenna module which is electrically connected with the at least one processor, wherein the antenna module includes a printed circuit board (PCB) which includes a first surface and a second surface which is parallel to the first surface, an antenna which is disposed on the first surface, a radio frequency integrated circuit (RFIC) which is disposed on the second surface and is electrically connected with the antenna, a phase shifter which is electrically connected with the RFIC and is disposed inside the RFIC, and a switch circuit which is connected with the antenna, the RFIC, and the phase shifter, and wherein the at least one processor is configured to, when the antenna is connected with the RFIC at a first point, control the switch circuit such that the antenna is connected with the phase shifter at a second point which is spaced apart from the first point of the antenna, and, when the antenna is connected with the phase shifter at the first point, control the switch circuit such that the antenna is connected with the RFIC at the second point.

In accordance with another aspect of the disclosure, an antenna structure is provided. The antenna structure includes a printed circuit board (PCB) which includes a first surface and a second surface facing in an opposite direction to the first surface, a conductive patch which is disposed on the first surface or inside the PCB adjacent to the first surface rather than the second surface, a ground which is disposed in the PCB, a first via which penetrates through at least part of the PCB and is connected with the conductive patch, and a second via which is spaced apart from the first via and is connected with the conductive patch, a radio frequency integrated circuit (RFIC) which is disposed on the second surface, and a phase shifter which is disposed on the second surface or on the conductive patch to be electrically connected with the RFIC, or is disposed inside the RFIC, wherein the conductive patch is connected with the RFIC through the first via, and the phase shifter and the second via are electrically connected between the conductive patch and the ground.

In the antenna structure according to various embodiments of the disclosure, an antenna radiator is connected with a radio frequency integrated circuit (RFIC) and a phase shifter through paths distinct from each other, so that a resonance frequency of a high frequency signal transmitted or received by the antenna is controlled.

In the antenna structure according to various embodiments of the disclosure, a patch antenna is connected with a phase shifter disposed in the antenna structure, so that the transmission line effect is reduced and restrictions on a design are reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Figure 1:
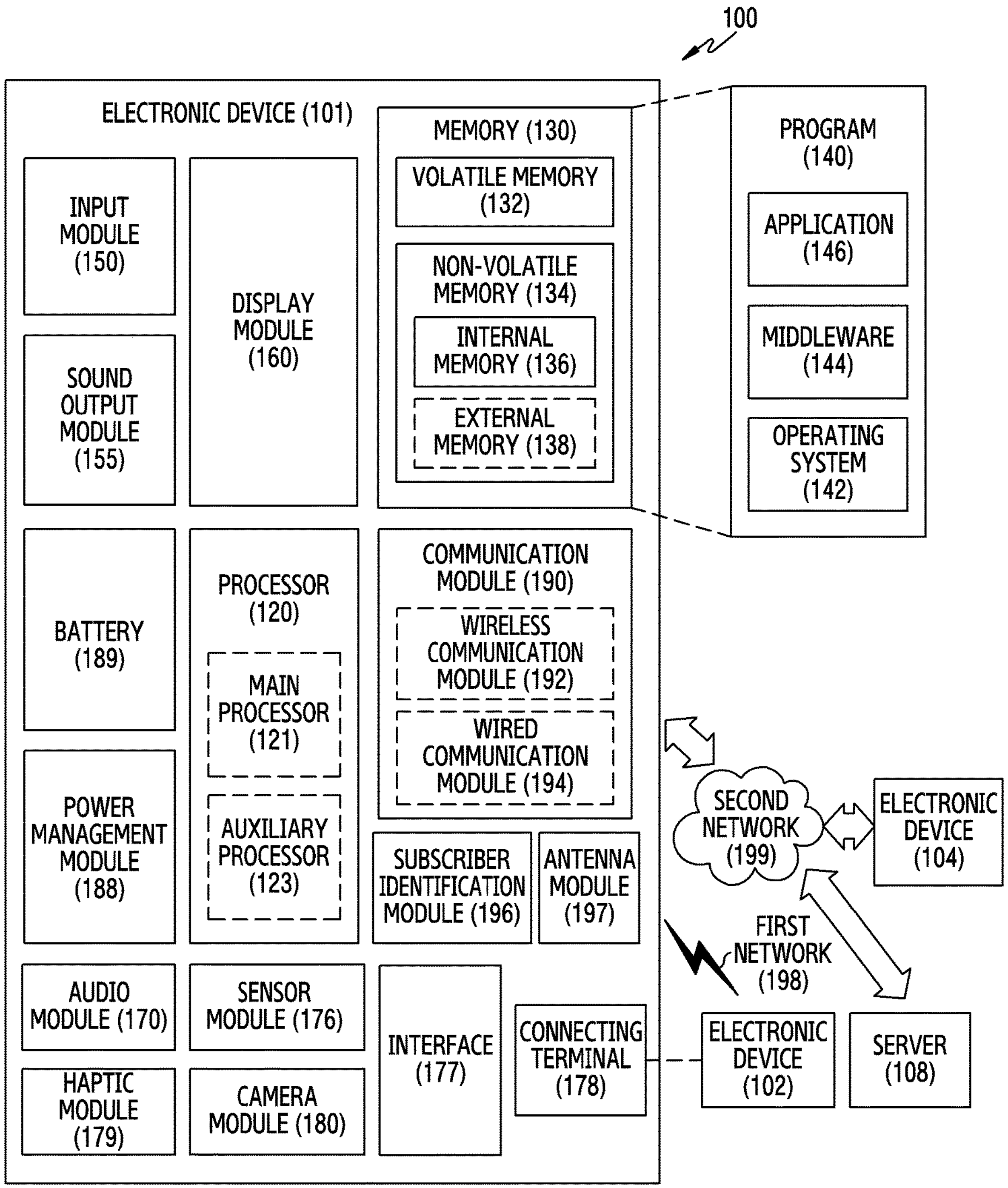
FIG. 1 is a block diagram of an electronic device in a network environment according to an embodiment of the disclosure.

FIG. 1 is a block diagram of an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or may communicate with an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module 196, or an antenna module 197. In some embodiments, at least one (e.g., the connection terminal 178) of the components may be omitted from the electronic device 101, or one or more other components may be added in the electronic device 101. In some embodiments, some of the components (e.g., the sensor module 176, the camera module 180, or the antenna module 197) may be integrated into one component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in a volatile memory 132, may process the command or the data stored in the volatile memory 132, and may store resulting data in a non-volatile memory 134. According to an embodiment, the processor 120 may include a main processor 121 (e.g., a central processing device or an application processor), or an auxiliary processor 123 (e.g., a graphics processing device, a neural processing unit (NPU), an image signal processor, a sensor hub processor, or a communication processor) that is operable independently from, or in conjunction with, the main processor 121. For example, when the electronic device 101 includes the main processor 121 and the auxiliary processor 123, the auxiliary processor 123 may be set to consume lower power than the main processor 121, or to be specific to a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of other components (e.g., the camera module 180 or the communication module 190) functionally related thereto. According to an embodiment, the auxiliary processor 123 (e.g., a neural processing unit) may include a hardware structure that is specific to processing of an artificial intelligence (AI) model. The AI model may be created through machine learning. Such learning may be performed in the electronic device 101 itself, which performs the AI model, or may be performed through a separate server (e.g., the server 108). A learning algorithm may include, for example, supervised learning, unsupervised learning, semi-supervised learning, or reinforcement learning, but is not limited to the above-described example. The AI model may include a plurality of AI neural network layers. The AI neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network or one of combinations of two or more of the aforementioned neural networks, but is not limited to the above-described examples. The AI model may include a software structure additionally or alternatively, in addition to the hardware structure.

The memory 130 may store various data used by at least one component (e.g., the processor 120 or the sensor module 176) of the electronic device 101. The data may include, for example, software (e.g., the program 140) and input data or output data regarding a command related thereto. The memory 130 may include the volatile memory 132 or the non-volatile memory 134.

The program 140 may be stored in the memory 130 as software, and may include, for example, an operating system 142, middleware 144, or an application 146.

The input module 150 may receive a command or data to be used by a component (e.g., the processor 120) of the electronic device 101, from the outside (e.g., a user) of the electronic device 101. The input module 150 may include, for example, a microphone, a mouse, a keyboard, a key (e.g., a button) or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding device. According to an embodiment, the display module 160 may include a touch sensor set to detect a touch, or a pressure sensor set to measure the intensity of force generated by a touch.

The audio module 170 may convert a sound into an electrical signal or, reversely, may convert an electrical signal into a sound. According to an embodiment, the audio module 170 may obtain a sound via the input module 150, or may output a sound via the sound output module 155 or an external electronic device (e.g., the electronic device 102) (e.g., a speaker or a headphone) directly or wirelessly coupled with the electronic device 101.

The sensor module 176 may detect an operational state (e.g., power or temperature) of the electronic device 101 or an environmental state (e.g., a state of a user) external to the electronic device, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support at least one specified protocol to be used for the electronic device 101 to be coupled with an external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with an external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be perceived by a user via tactile sensation or kinesthetic sensation of a user. According to an embodiment, the haptic module 179 may include, for example, a motor, a piezoelectric element, or an electric stimulator.

The camera module 180 may capture a still image or a moving image. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishment of a direct (e.g., wired) communication channel or a wireless communication channel between the electronic device 101 and an external electronic device (e.g., the electronic device 102, the electronic device 104, or the server 108), and performance of communication via the established communication channel. The communication module 190 may include at least one communication processor that is operable independently from the processor 120 (e.g., an application processor) and supports direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication module). A corresponding communication module of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be integrated into a single component (e.g., a single chip), or may be implemented as a plurality of components (e.g., a plurality of chips) separate from one another. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network beyond a 4G network, and a next-generation communication technology, for example, a new radio (NR) access technology. The NR access technology may support high-speed transmission of high-capacity data (enhanced mobile broadband (eMBB)), terminal power minimization and access by multiple terminals (massive machine type communications (mMTC)), or high-reliability and low-latency (ultra-reliable and low latency communications (URLLC)). For example, the wireless communication module 192 may support a high frequency band (e.g., mmWave band) to achieve a high data transmission rate. The wireless communication module 192 may support various technologies for guaranteeing performance in a high frequency band, for example, beamforming, massive multiple-input and multiple-output (MIMO), full dimensional MIMO (FD-MIMO), array antenna, analog beamforming, or large scale antenna. The wireless communication module 192 may support various requirements prescribed for the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, a loss coverage (e.g., 164 dB or less) for implementing mMTC, or U-plane latency (e.g., downlink (DL) and uplink (UL) of 0.5 ms or less, or round trip of 1 ms or less) for implementing URLLC.

The antenna module 197 may transmit or receive a signal or power to or from the outside (e.g., an external electronic device). According to an embodiment, the antenna module 197 may include an antenna including a radiator which is formed of a conductor or a conductive pattern formed on a substrate (e.g., a PCB). According to an embodiment, the antenna module 197 may include a plurality of antennas (e.g., an array antenna). In this case, at least one antenna appropriate for a communication scheme used in a communication network, such as the first network 198 or the second network 199, may be selected from the plurality of antennas by the communication module 190. A signal or power may be transmitted or received between the communication module 190 and an external electronic device via the selected at least one antenna. According to a certain embodiment, in addition to the radiator, other components (e.g., a radio frequency integrated circuit (RFIC)) may be additionally formed as part of the antenna module 197.

According to various embodiments, the antenna module 197 may form an mmWave antenna module. According to an embodiment, the mmWave antenna module may include a printed circuit board, an RFIC which is disposed on a first surface (e.g., a lower surface) of the printed circuit board or adjacent thereto, and supports a designated high frequency band (e.g., mmWave band), and a plurality of antennas (e.g., an array antenna) which are disposed on a second surface (e.g., an upper surface or a side surface) of the printed circuit board or adjacent thereto, and transmit or receive a signal of the designated high frequency band.

At least some of the above-described components may be coupled to one another and may exchange signals (e.g., commands or data) with one another through an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled to the second network 199. The external electronic device 102 or 104 may be a device of a same type as, or a different type, from the electronic device 101. According to an embodiment, all or some of operations to be executed at the electronic device 101 may be executed in one or more external electronic devices of the external electronic devices 102, 104, or 108. For example, if the electronic device 101 should perform a function or a service automatically, or in response to a request from a user or another device, the electronic device 101, instead of or in addition to executing the function or the service, may request one or more external electronic devices to perform at least part of the function or the service. The one or more external electronic devices receiving the request may perform at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To achieve this, cloud computing, distributed computing, mobile edge computing (MEC), or client-server computing technology may be used, for example. The electronic device 101 may provide an ultra-low latency service by using distributed computing or mobile edge computing, for example. In another embodiment, the external electronic device 104 may include an Internet of things (IoT) device. The server 108 may be an intelligent server that uses machine learning and/or a neural network. According to an embodiment, the external electronic device 104 or the server 108 may be included in the second network 199. The electronic device 101 may be applied to an intelligent service (e.g., smart home, smart city, smart car, or health care) based on a 5G communication technology and an IoT-related technology.

The electronic device according to various embodiments of the disclosure may be various types of devices. The electronic device may include, for example, a portable communication device (e.g., a smart phone), a computer device, a portable multimedia device, a portable medical device, a camera, a wearable device, or a home appliance. According to an embodiment of the disclosure, the electronic device is not limited to the above-described devices.

It should be appreciated that various embodiments of the disclosure and the terms used therein are not intended to limit the technological features set forth herein to particular embodiments, and include various changes, equivalents, or alternatives for a corresponding embodiment. With regard to the description of the drawings, similar reference numerals may be used to refer to similar or related elements. It is to be understood that a singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include one or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to", "connected with", or "connected to" another element (e.g., a second element), it means that the element may be coupled with another element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute the at least one instruction. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case where data is semi-permanently stored in the storage medium and a case where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or may be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in other components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
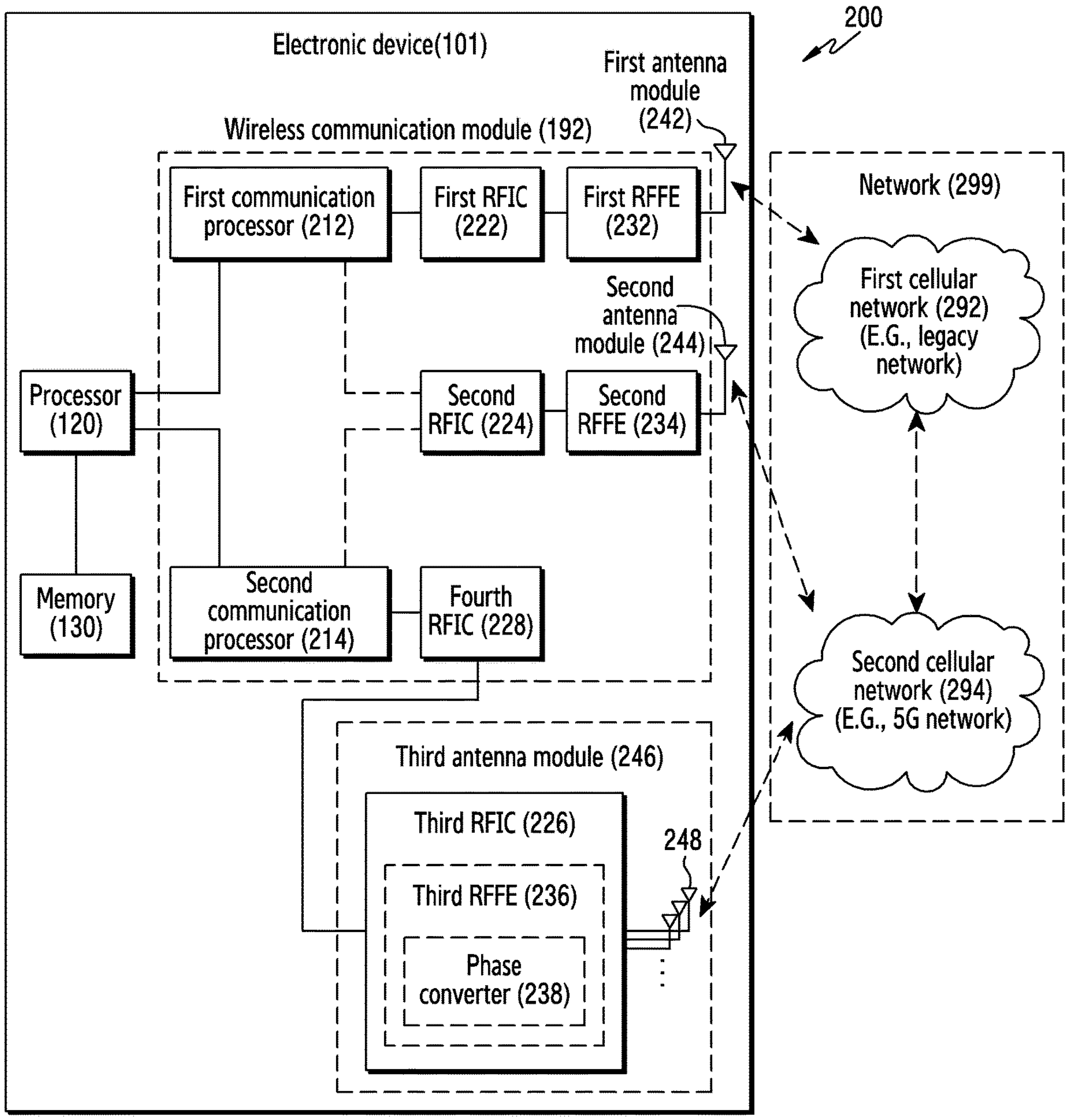
FIG. 2 is a block diagram of an electronic device for supporting legacy network communication and 5G network communication according to an embodiment of the disclosure.

FIG. 2 is a block diagram 200 of an electronic device 101 for supporting legacy network communication and 5G network communication according to an embodiment of the disclosure.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A network 299 may include a first network 292 and a second network 294. According to another embodiment of the disclosure, the electronic device 101 may further include at least one of the components illustrated in FIG. 1, and the network 299 may further include at least one other network. The first communication processor 212, the second communication processor 214, the first RFIC 222, the second RFIC 224, the fourth RFIC 228, the first RFFE 232, and the second RFFE 234 may form at least part of a wireless communication module 192. According to another embodiment of the disclosure, the fourth RFIC 228 may be omitted or may be included as part of the third RFIC 226.

The first communication processor 212 may establish a communication channel of a band to be used for wireless communication with the first network 292, and may support legacy network communication via the established communication channel. The first network may be a legacy network including a second generation (2G), third generation (3G), 4G, or long term evolution (LTE) network. The second communication processor 214 may establish a communication channel corresponding to a designated band (e.g., about 6 GHz to about 60 GHz) among bands to be used for wireless communication with the second network 294, and may support 5G network communication via the established communication channel. The second network 294 may be a 5G network which is defined in 3G partnership project (3GPP). Additionally, the first communication processor 212 or the second communication processor 214 may establish a communication channel corresponding to another designated band (e.g., about 6 GHz or lower) among the bands to be used for wireless communication with the second network 294, and may support 5G network communication via the established communication channel. The first communication processor 212 and the second communication processor 214 may be implemented within a single chip or a single package. The first communication processor 212 or the second communication processor 214 may be formed within a single chip or a single package, with the processor 120, the auxiliary processor 123, or the communication module 190.

When transmitting signals, the first RFIC 222 may convert a baseband signal, which is generated by the first communication processor 212, into a radio frequency (RF) signal of about 700 MHz to about 3 GHz to be used in the first network 292 (e.g., a legacy network). When signals are received, an RF signal may be acquired from the first network 292 (e.g., the legacy network) via an antenna (e.g., the first antenna module 242), and may be pre-processed through an RFFE (e.g., the first RFFE 232). The first RFIC 222 may convert the pre-processed RF signal into a baseband signal to be processed by the first communication processor 212.

When transmitting signals, the second RFIC 224 may convert a baseband signal, which is generated by the first communication processor 212 or the second communication processor 214, into an RF signal (hereinafter, a 5G Sub6 RF signal) of a Sub6 band (e.g., about 6 GHz or lower) to be used in the second network 294 (e.g., a 5G network). When signals are received, a 5G Sub6 RF signal may be acquired from the second network 294 (e.g., the 5G network) via an antenna (e.g., the second antenna module 244), and may be pre-processed through an RFFE (e.g., the second RFFE 234). The second RFIC 224 may convert the pre-processed 5G Sub6 RF signal into a baseband signal to be processed by a corresponding communication processor among the first communication processor 212 or the second communication processor 214.

The third RFIC 226 may convert a baseband signal, which is generated by the second communication processor 214, into an RF signal (hereinafter, a 5G Above6 RF signal) of a 5G Above6 band (e.g., about 6 GHz to about 60 GHz) to be used in the second network 294 (e.g., the 5G network). When signals are received, a 5G Above6 RF signal may be acquired from the second network 294 (e.g., the 5G network) via an antenna (e.g., the antenna 248), and may be pre-processed through the third RFFE 236. The third RFIC 226 may convert the pre-processed 5G Above6 RF signal into a baseband signal to be processed by the second communication processor 214. The third RFFE 236 may be formed as part of the third RFIC 226.

The electronic device 101 may include the fourth RFIC 228 separately from or as part of the third RFIC 226. In this case, the fourth RFIC 228 may convert a baseband signal, which is generated by the second communication processor 214, into an RF signal of an intermediate frequency band (e.g., about 9 GHz to about 11 GHz) (hereinafter, an IF signal), and then may transfer the IF signal to the third RFIC 226. The third RFIC 226 may convert the IF signal into a 5G Above6 RF signal. When signals are received, a 5G Above6 RF signal may be received from the second network 294 (e.g., the 5G network) via an antenna (e.g., the antenna 248), and may be converted into an IF signal by the third RFIC 226. The fourth RFIC 228 may convert the IF signal into a baseband signal to be processed by the second communication processor 214.

The first RFIC 222 and the second RFIC 224 may be implemented as part of a single chip or single package. The first RFFE 232 and the second RFFE 234 may be implemented as part of a single chip or a single package. At least one antenna module of the first antenna module 242 or the second antenna module 244 may be omitted, or may be coupled with another antenna module to process RF signals of a plurality of corresponding frequency bands.

The third RFIC 226 and the antenna 248 may be disposed on the same substrate to form a third antenna module 246. For example, the wireless communication module 192 or the processor 120 may be disposed on a first substrate (e.g., a main PCB). In this case, the third antenna module 246 may be formed by the third RFIC 226 being disposed on an area (e.g., a lower surface) of a second substrate (e.g., a sub PCB) separate from the first substrate, and the antenna 248 being disposed on another area (e.g., an upper surface). The third RFIC 226 and the antenna 248 may be disposed on the same substrate, so that a length of a transmission line therebetween may be reduced. This may reduce loss (e.g., attenuation) of a signal of a high frequency band (e.g., about 6 GHz to about 60 GHz) used for 5G network communication, which is caused by a transmission line. Accordingly, the electronic device 101 may enhance quality or speed of communication with the second network 294 (e.g., the 5G network).

The antenna 248 may be formed as an antenna array including a plurality of antenna elements to be used for beamforming. In this case, the third RFIC 226 may include a plurality of phase shifters 238 corresponding to the plurality of antenna elements, as part of the third RFFE 236. When transmitting signals, the plurality of phase shifters 238 may shift phases of 5G Above6 RF signals to be transmitted to the outside (e.g., a base station of the 5G network) of the electronic device 101 via corresponding antenna elements. When receiving signals, the plurality of phase shifters 238 may shift phases of 5G Above6 RF signals received from the outside through corresponding antenna elements to the same phases or substantially the same phases. This makes it possible to transmit or receive through beamforming between the electronic device 801 and the outside.

The second network 294 (e.g., the 5G network) may be operated independently from the first network 292 (e.g., the legacy network) (e.g., stand-alone (SA)), or may be operated in conjunction therewith (e.g., non-stand alone (NSA)). For example, the 5G network may include only an access network (e.g., a 5G radio access network (RAN) or a next generation RAN (NG RAN)), and may omit a core network (e.g., a next generation core (NGC)). In this case, after accessing the access network of the 5G network, the electronic device 101 may access an external network (e.g., the Internet) under control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 230, and may be accessed by other components (e.g., the processor 120, the first communication processor 212, or the second communication processor 214).

Figures 3A, 3B:
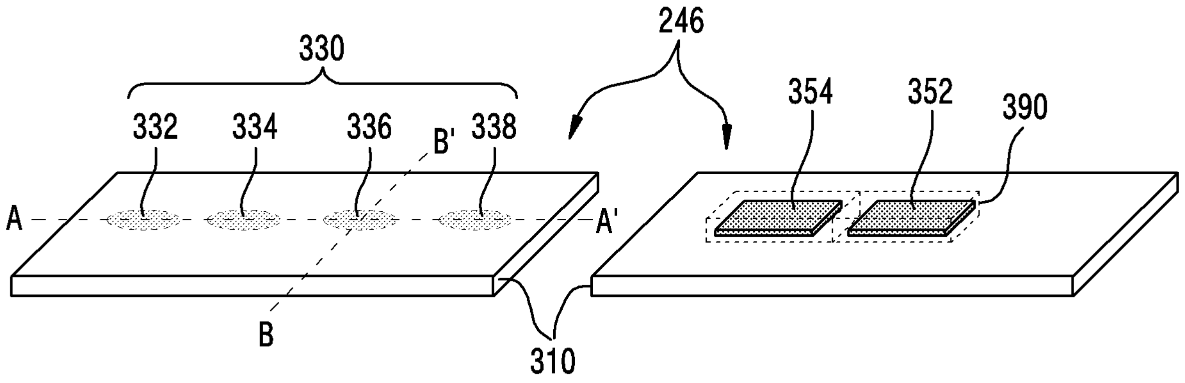
FIGS. 3A, 3B, and 3C are views illustrating an embodiment of a structure of a third antenna module explained with reference to FIG. 2, for example according to various embodiments of the disclosure.
Figure 3C:
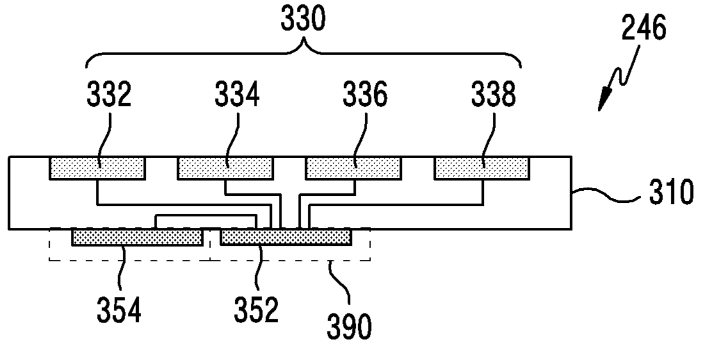

FIGS. 3A to 3C illustrate an embodiment of the structure of the third antenna module 246 described with reference to FIG. 2 according to various embodiments of the disclosure. FIG. 3A is a perspective view of the third antenna module 246 as viewed from one side, and FIG. 3B is a perspective view of the third antenna module 246 as viewed from the other side. FIG. 3C is a cross-sectional view taken on line A-A', illustrating the third antenna module 246.

Referring to FIGS. 3A to 3C, the third antenna module 246 may include a printed circuit board 310, an antenna array 330, a radio frequency integrated circuit (RFIC) 352, a power management integrate circuit (PMIC) 354, and a module interface (not shown). Optionally, the third antenna module 246 may further include a shielding member 390. In other embodiments, at least one of the aforementioned components may be omitted or at least two of the aforementioned components may be integrated.

The printed circuit board 310 may include a plurality of conductive layers and a plurality of nonconductive layers which are stacked alternately with the conductive layers. The printed circuit board 310 may provide electrical connection between the printed circuit board 310 and/or various electronic components disposed outside by using wires and conductive vias which are formed on the conductive layer.

The antenna array 330 (e.g., antenna 248 of FIG. 2) may include a plurality of antenna elements 332, 334, 336, or 338 disposed to form a directional beam. The antenna elements may be formed on a first surface of the printed circuit board 310 as shown in the drawings. According to another embodiment, the antenna array 330 may be disposed inside the printed circuit board 310. According to embodiments, the antenna array 330 may include a plurality of antenna arrays of the same or different shapes or kinds (e.g., a dipole antenna array and/or a patch antenna array).

The RFIC 352 (e.g., third RFIC, 226 of FIG. 2) may be disposed on another area (e.g., a second surface opposite to the first surface) of the printed circuit board 310 that is spaced apart from the antenna array. The RFIC may be configured to process a signal of a selected frequency band which is transmitted/received through the antenna array 330. When transmitting a signal, the RFIC 352 may convert a baseband signal acquired from a communication processor (not shown) into an RF signal of a designated band. When receiving a signal, the RFIC 352 may convert an RF signal received through the antenna array into a baseband signal, and may transmit the signal to the communication processor.

According to another embodiment of the disclosure, when transmitting a signal, the RFIC 352 may up-convert an IF signal (e.g., about 9 GHz to about 11 GHz) acquired from an intermediate frequency integrate circuit (IFIC) (e.g., 228 of FIG. 2) into an RF signal of a selected band. When receiving a signal, the RFIC 352 may down-convert an RF signal acquired through the antenna array into an IF signal, and may transmit the signal to the IFIC.

The PMIC 354 may be disposed on a part of another area (e.g., the second surface) of the printed circuit board 310, which is spaced apart from the antenna array. The PMIC may receive a voltage from a main PCB (not shown) and may provide necessary power to various components (e.g., the RFIC 352) on the antenna module.

The shielding member 390 may be disposed on a part (e.g., the second surface) of the printed circuit board 310 to electromagnetically shield at least one of the RFIC 352 or the PMIC 354. The shielding member 390 may include a shield can.

The third antenna module 246 may be electrically connected with another printed circuit board (e.g., a major circuit board) through the module interface although the module interface is not illustrated. The module interface may include a connection member, such as a coaxial cable connector, a board-to-board connector, an interposer, or a flexible printed circuit board (FPCB). The RFIC 352 and/or the PMIC 354 of the antenna module may be electrically connected with the printed circuit board through the connection member.

Figure 4:
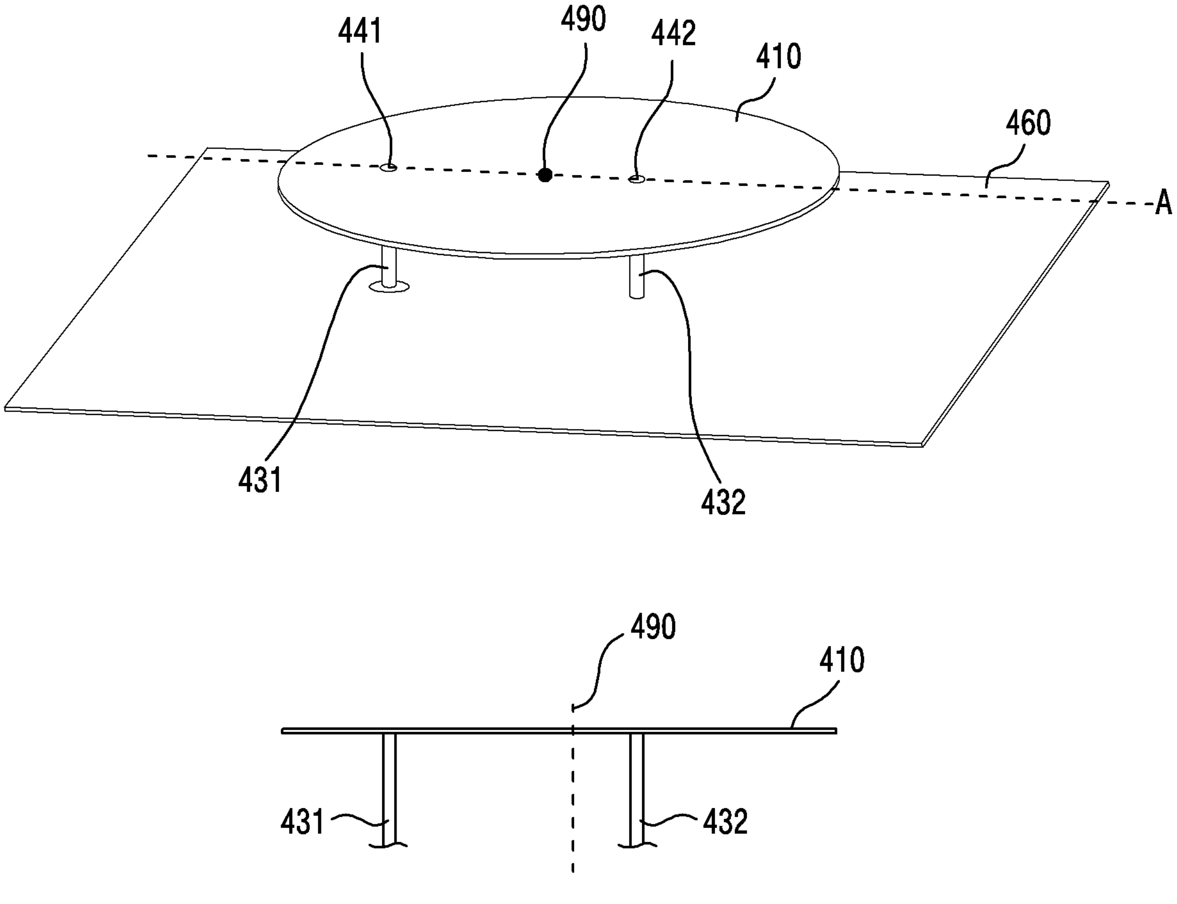
FIG. 4 is a view illustrating a conductive patch which is connected with at least part of a PCB through a first via and a second via according to an embodiment of the disclosure.

FIG. 4 illustrates a conductive patch which is connected with at least part of a PCB through a first via and a second via according to an embodiment of the disclosure.

Referring to FIG. 4, an antenna module (e.g., the third antenna module 245 of FIG. 2) may include a conductive patch 410 and a first layer 460 of a PCB which is connected with the conductive patch 410 through a first via 431 and/or a second via 432. For example, the conductive patch 410 may operate as a radiator of a patch antenna. The first via 431 may be formed to pass through a penetrating hole formed on the first layer 460.

The conductive patch 410 may be electrically connected with the first via 431 and the second via 432. The conductive patch 410 may be connected with the first layer 460 of the PCB through the second via 432. The first layer 460 may include a copper foil of the PCB, but is not limited thereto and may include at least one of a conductive layer or a ground layer.

The conductive patch 410 may be connected with a radio frequency integrated circuit (RFIC) (e.g., the third RFIC 226 of FIG. 2) through the first via 431, and may be connected with a phase shifter through the second via 432. This will be described in detail below. The conductive patch 410 may be fed with power through the first via 431 to be able to transmit or receive a signal of a designated frequency band.

The first via 431 and the second via 432 may be spaced apart from each other and may be connected with the conductive patch 410. The first via 431 and the second via 432 may be spaced apart from a center 490 of the conductive patch 410, respectively. The first via 431 may be connected with the conductive patch 410 at a first point 441 (or a feeding point) that is spaced apart from the center 490 of the conductive patch 410. The second via 432 may be connected with the conductive patch 410 at a second point 442 (or a ground point) that is spaced apart from the center 490 of the conductive patch 410.

The center 490 of the conductive patch 410 may be disposed between the first via 431 and the second via 432 on a virtual axis (A) which is formed by the first point 441 and the second point 442. A frequency of a signal that is transmitted or received through the conductive patch 410 may be changed according to a distance from the center 490 of the conductive patch 410 to the second via 432 (or the second point 442).

Figure 5A:
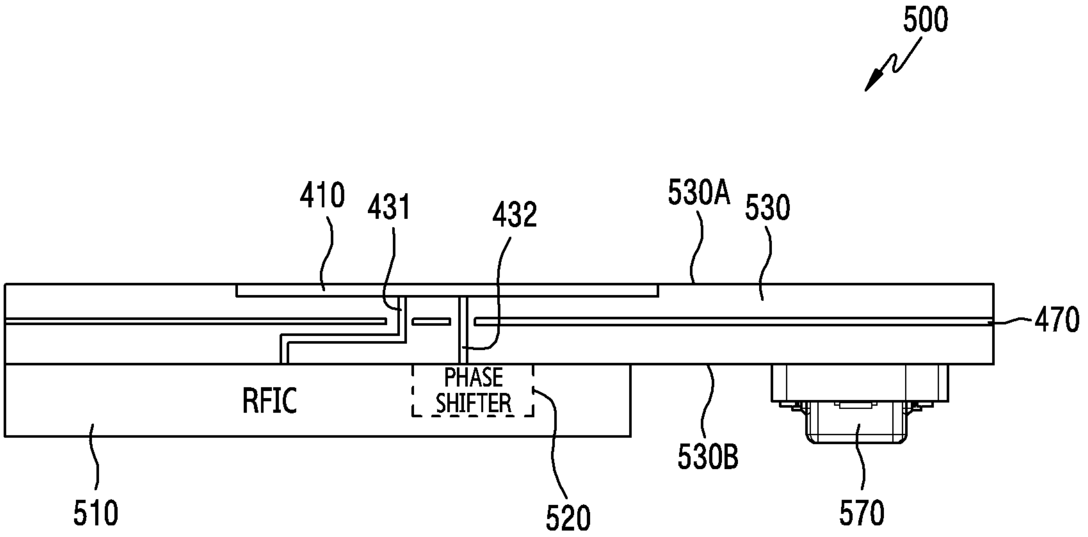
FIG. 5A is a view illustrating an antenna structure including a conductive patch which is connected with an RFIC and a phase shifter disposed in the RFIC according to an embodiment of the disclosure.
Figure 5B:
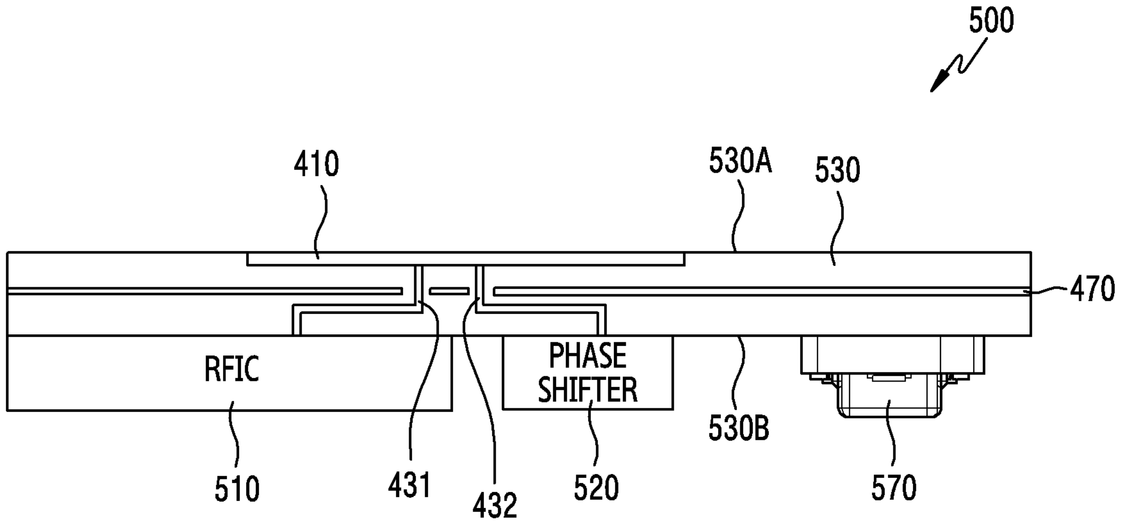
FIG. 5B is a view illustrating an antenna structure including a conductive patch which is connected with an RFIC and a phase shifter disposed on a second surface of a PCB according to an embodiment of the disclosure.
Figure 5C:
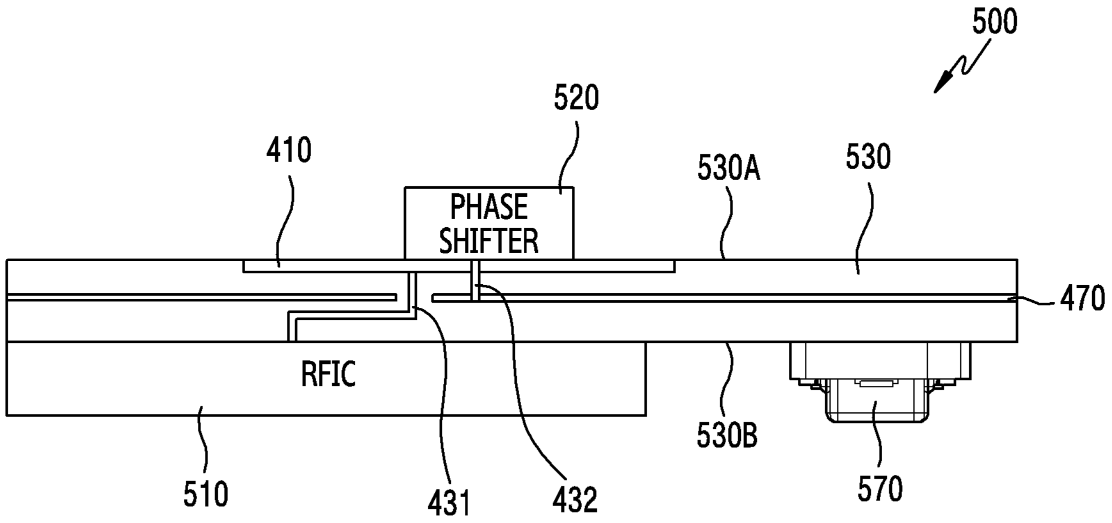
FIG. 5C is a view illustrating an antenna structure including a conductive patch which is connected with an RFIC and a phase shifter disposed on the conductive patch according to an embodiment of the disclosure.
Figure 5D:
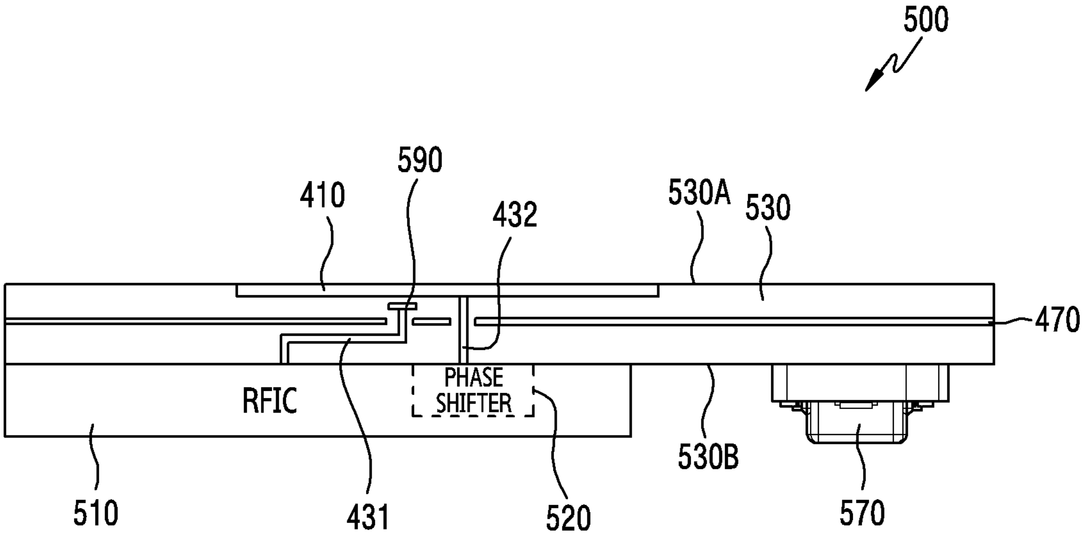
FIG. 5D is a view illustrating an antenna structure including a coupling pad according to an embodiment of the disclosure.
Figure 5E:
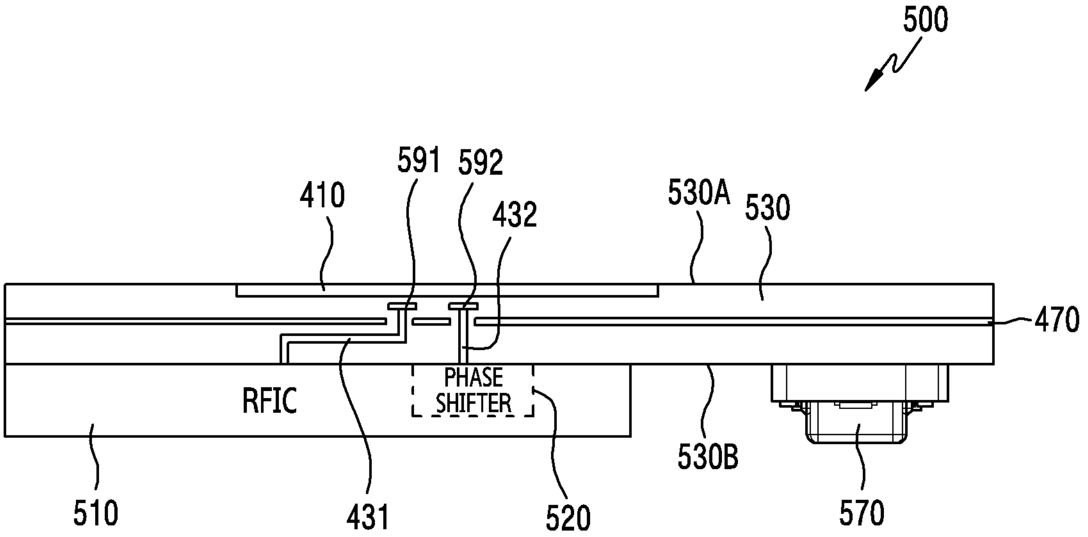
FIG. 5E is a view illustrating an antenna structure in which an RFIC and a phase shifter are indirectly connected with a conductive patch according to an embodiment of the disclosure.

FIG. 5A illustrates an antenna module including a conductive patch which is connected with an RFIC and a phase shifter disposed inside the RFIC according to an embodiment of the disclosure. FIG. 5B illustrates an antenna module including a conductive patch which is connected with an RFIC and a phase shifter disposed on a second surface of the PCB according to an embodiment of the disclosure. FIG. 5C illustrates an antenna module including a conductive patch which is connected with an RFIC and a phase shifter disposed on the conductive patch according to an embodiment of the disclosure. FIG. 5D illustrates an antenna structure including a coupling pad according to an embodiment of the disclosure. FIG. 5E illustrates an antenna structure in which an RFIC and a phase shifter are indirectly connected with a conductive patch according to an embodiment of the disclosure.

Referring to FIGS. 5A to 5D, an antenna module 500 may include a printed circuit board (PCB) 530, a conductive patch 410 disposed on the PCB 530, a first via 431 connected with the conductive patch 410, a second via 432 spaced apart from the first via 431, a ground 470 disposed inside the PCB 530, an RFIC 510 (e.g., the RFIC 352 of FIGS. 3A to 3C), a phase shifter 520 and/or a connector 570. According to another embodiment of the disclosure (not shown), some of the above-described components (e.g., the connector 570) may be omitted and other components may be added. The phase shifter 520 may operate as a tuner or a tuning switch.

The conductive patch 410 may be disposed on one surface (hereinafter, a first surface) of the PCB 530 or inside the PCB 530 adjacent to the first surface 530A rather than a second surface 530B. The antenna module 500 may include the RFIC 510 disposed on the second surface 530B of the PCB 530 which is parallel to the first surface 530A.

The conductive patch 410 may be connected with the first via 431 and the second via 432. The conductive patch 410 may be connected with the first via 431 at a first point (e.g., the first point 441 of FIG. 4), and may be connected with the second via 432 at a second point (e.g., the second point 442 of FIG. 4) which is spaced apart from the first point. The first via 431 and the second via 432 may pass through at least part of the PCB 530.

The RFIC 510 may be electrically connected with the conductive patch 410 through the first via 431. The RFIC 510 may feed power to the conductive patch 410 through the first via 431, thereby enabling transmission and/or reception of a signal of a designated frequency band. For example, the RFIC 510 may feed power to the conductive patch 410 through the first via 431, thereby enabling the conductive patch 410 to transmit or receive a signal of a 28 GHz frequency band.

The conductive patch 410 may be connected with the phase shifter 520 through the second via 432. The phase shifter 520 may be electrically connected with the conductive patch 410 and/or the ground 470 through the second via 432. The phase shifter 520 may include at least part of at least one variable capacitor, at least one inductor, and at least one switch.

The antenna module 500 may include the connector 570 which is connected with at least one processor (e.g., the processor 120 of FIG. 1) or a communication module (e.g., the communication module 190 of FIG. 1). The antenna module 500 may include the connector 570 which is disposed on the second surface 530B of the PCB 530. For example, the connector 570 may include a board-to-board connector (B-to-B connector), but is not limited thereto. The antenna module 500 may be electrically connected with the at least one processor and/or the communication module through the connector 570.

The phase shifter 520 may be included in the RFIC 510. The RFIC 510 may control the phase shifter 520 based on a control signal received through the connector 570. For example, the RFIC 510 may control at least part of the at least one variable capacitor, the at least one inductor, and the at least one switch which are included in the phase shifter 520. The RFIC 510 may adjust a resonance frequency of a signal transmitted and/or received through the conductive patch 410, by controlling the phase shifter 520. For example, the RFIC 510 may adjust a resonance frequency of a signal transmitted or received through the conductive patch 410, by adjusting impedance through the phase shifter 520. Through this, the antenna module 500 may transmit or receive the signal of the adjusted frequency band.

Referring to FIG. 5A, the phase shifter 520 according to an embodiment of the disclosure may be disposed inside the RFIC 510. The conductive patch 410 may be electrically connected with the phase shifter 520 disposed inside the RFIC 510 through the second via 432. The second via 432 may be connected with the RFIC 510, thereby being electrically connected with the phase shifter 520.

Referring to FIG. 5B. the phase shifter 520 according to an embodiment of the disclosure may be disposed on the second surface of the PCB 530. The phase shifter 520 may be spaced apart from the RFIC 510, and may be disposed on the second surface of the PCB 530.

Referring to FIG. 5C, according to an embodiment of the disclosure, the phase shifter 520 may be disposed on the first surface of the PCB 530. The phase shifter 520 may be disposed on the conductive patch 410. The phase shifter 520 may be disposed on the conductive patch 410 adjacent to a center (e.g., the center 490 of FIG. 4) of the conductive patch 410. The antenna module 500 may include a separate control circuit (not shown) for controlling the phase shifter 520 and controlling power. The control circuit may be electrically connected with the conductive patch 410 and/or the phase shifter 520. The antenna module 500 may include an inductor which is disposed on a path through which the control circuit and the conductive patch 410 are connected. Electrical paths for connecting the control circuit to the conductive patch 410 and/or the phase shifter 520 may be disposed adjacent to the center of the conductive patch 410. The phase shifter 520 may be disposed adjacent to the center of the conductive patch 410. The phase shifter 520 may be electrically connected with the conductive patch 410.

The conductive patch 410 may include a space (or an opening) for connecting the second via 432 with the phase shifter 520. For example, the second via 432 may be connected with the ground 470, the conductive patch 410, and the phase shifter 520. The phase shifter 520 and the second via 432 may be electrically connected between the conductive patch 410 and the ground 470.

An electrical path may be formed to be connected to the conductive patch 410, the phase shifter 520, the second via 432, and the ground 470. One end of the phase shifter 520 may be connected with the conductive patch 410, and the other end of the phase shifter 520 may be connected with the second via 432.

Referring to FIG. 5D, the antenna module 500 according to an embodiment of the disclosure may include a coupling pad 590 disposed inside the PCB 530. The coupling pad 590 may have a smaller size than the conductive patch 410. At least part of the coupling pad 590 may overlap the conductive patch 410 when viewed in a direction perpendicular to the first surface 530A and the second surface 530B of the PCB 530.

The coupling pad 590 may be connected with the first via 431. The coupling pad 590 may be electrically connected with the RFIC 510 through the first via 431.

The RFIC 510 may feed power to the coupling pad 590 through the first via 431. The RFIC 510 may feed power to the coupling pad 590, thereby feeding power to the conductive patch 410 through coupling between the coupling pad 590 and the conductive patch 410.

Referring to FIG. 5E, the antenna module 500 according to an embodiment of the disclosure may include a first coupling pad 591 and a second coupling pad 592 disposed inside the PCB 530. The first coupling pad 591 and the second coupling pad 592 may have a smaller size than the conductive patch 410. At least part of the first coupling pad 591 and the second coupling pad 592 may overlap the conductive patch 410 when viewed in a direction perpendicular to the first surface 530A and the second surface 530B of the PCB 530.

The second coupling pad 592 may be connected with the second via 432. The second coupling pad 592 may be electrically connected with the phase shifter 520 through the second via 432.

The phase shifter 520 may be connected with the second coupling pad 592 through the second via 432. The phase shifter 520 may be indirectly connected with the conductive patch 410 through coupling between the second coupling pad 592 and the conductive patch 410. The phase shifter 520 may control a frequency of a signal transmitted or received through the conductive patch 410 through coupling between the second coupling pad 592 and the conductive patch 410.

Figure 6A:
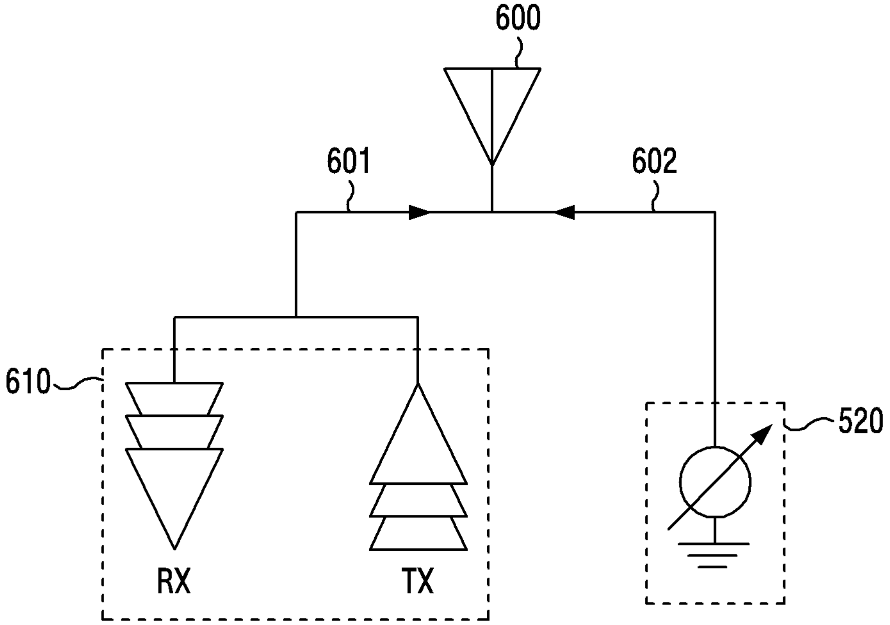
FIG. 6A is a view illustrating an antenna which is connected with an RFIC through a first path, and is connected with a phase shifter through a second path according to an embodiment of the disclosure.
Figure 6B:
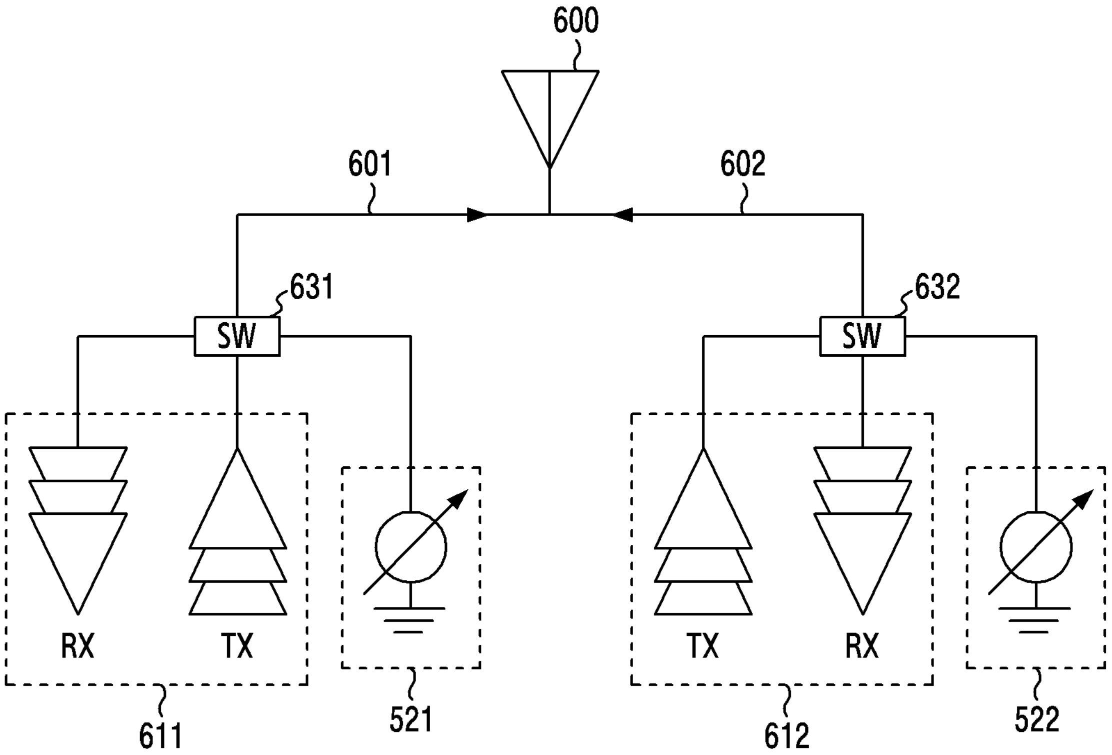
FIG. 6B is a view illustrating an antenna which is connected with an RFIC or a phase shifter through a first switch circuit and a second switch circuit, respectively, according to an embodiment of the disclosure.
Figure 6C:
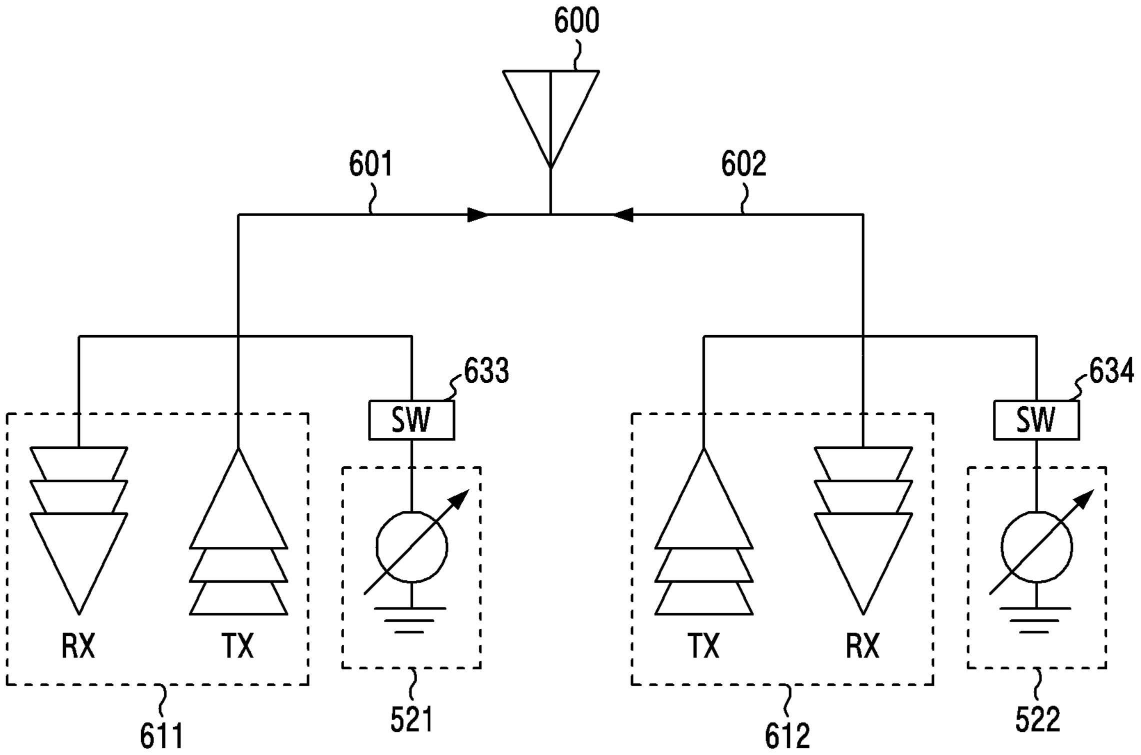
FIG. 6C is a view illustrating an antenna which is connected with an RFIC and/or a phase shifter through a first path and a second path, respectively, according to an embodiment of the disclosure.
Figure 6D:
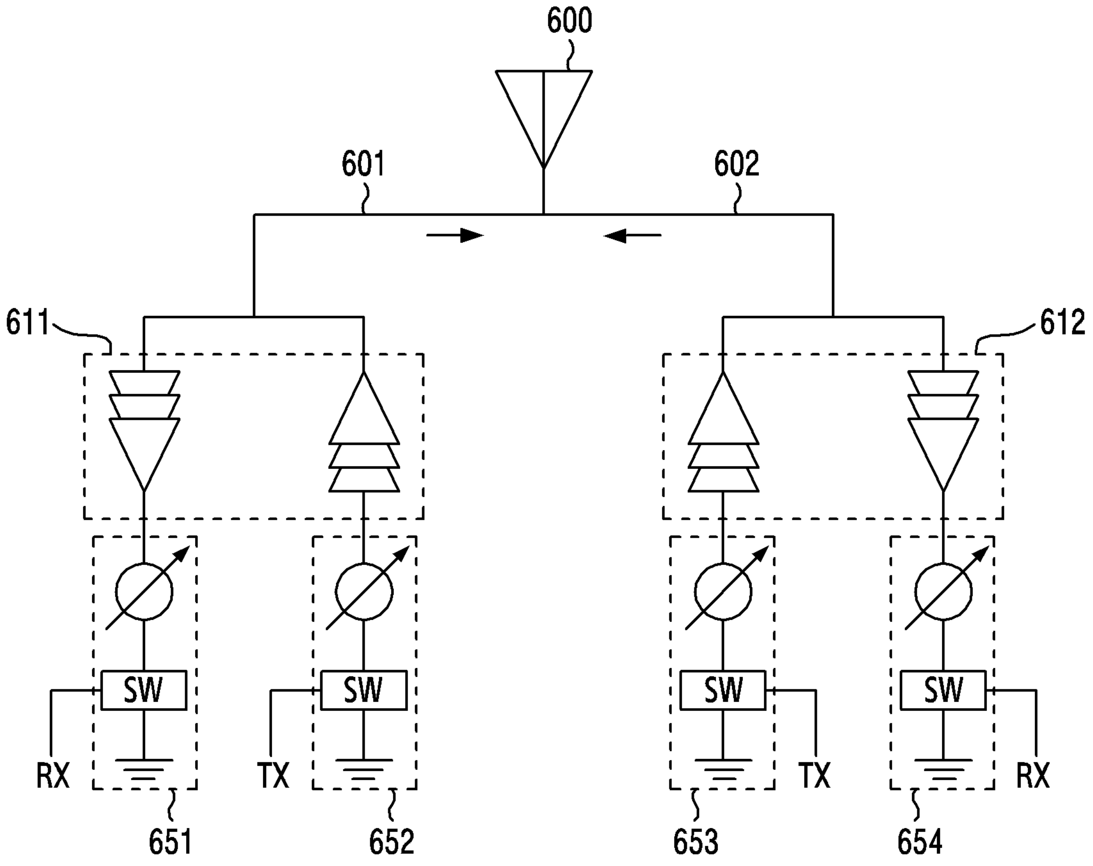
FIG. 6D is a view illustrating an antenna which is connected with a tuner and an RFFE according to an embodiment of the disclosure.
Figure 6E:
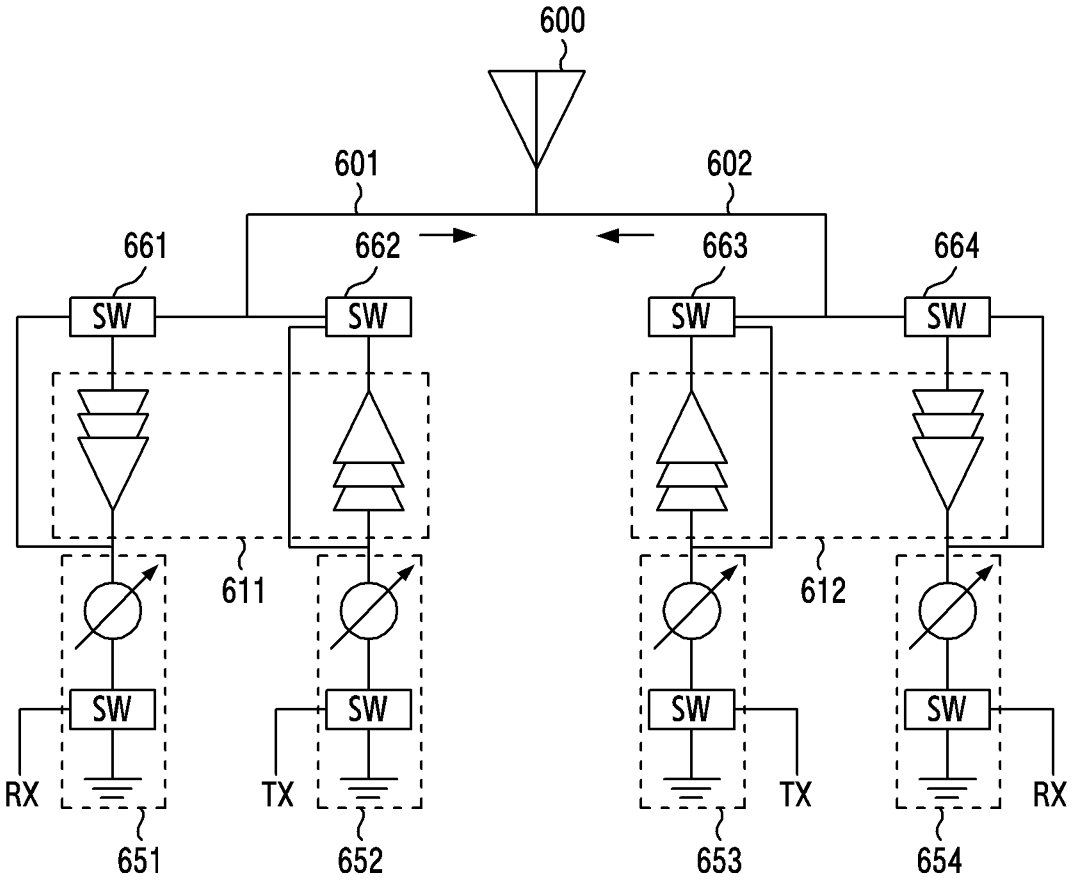
FIG. 6E is a view illustrating an antenna which is connected with a tuner and an RFFE through an external switch according to an embodiment of the disclosure.

FIG. 6A illustrates an antenna which is connected with an RFIC through a first path, and is connected with a phase shifter through a second path according to an embodiment of the disclosure. FIG. 6B illustrates an antenna which is connected with an RFIC or a phase shifter through a first switch circuit and a second switch circuit, respectively, according to an embodiment of the disclosure. FIG. 6C illustrates an antenna which is connected with an RFIC and/or a phase shifter through a first path and a second path, respectively, according to an embodiment of the disclosure. FIG. 6D illustrates an antenna which is connected with a tuner and an RFFE according to an embodiment of the disclosure. FIG. 6E illustrates an antenna which is connected with a tuner and an RFFE through a separate switch according to an embodiment of the disclosure.

Referring to FIGS. 6A to 6E, an antenna 600 (e.g., the conductive patch 410 of FIG. 4) may be connected with an RFFE 610 and a phase shifter 520. The phase shifter 520 may operate as a tuner or a tuning switch.

The antenna 600 may be electrically connected with the RFFE 610 and/or the phase shifter 520 through a first path 601 and a second path 602 which is distinguished from the first path 601. The antenna 600 may be connected with the RFFE 610 through the first path 601.

The RFFE 610 and the phase shifter 520 may be included in an RFIC (not shown) (e.g., the RFIC 352 of FIGS. 3A to 3C). The RFFE 610 may include at least one of an amplifier (a power amplifier (AF), a low noise amplifier (LNA)), or a diplexer therein, but is not limited thereto.

The first path 601 may include a conductive via (e.g., the first via 431 of FIG. 5A). The first path 601 may include a conductive via and/or a feeding line. The second path 602 may include a conductive via (e.g., the second via 432 of FIG. 5A). In another example, the second path 602 may include a conductive via and/or a feeding line.

When transmitting a signal, the RFIC may convert a baseband signal which is obtained from at least one processor (e.g., the processor 120 of FIG. 1) or a communication module (e.g., the communication module 190 of FIG. 1) connected through a connector (e.g., the connector 570 of FIG. 5A) into an RF signal of a designated band. When receiving a signal, the RFIC may convert an RF signal received through the antenna 600 into a baseband signal, and may transmit the signal to the at least one processor or the communication module connected through the connector.

The RFIC may adjust a resonance frequency of an RF signal transmitted or received through the antenna 600 by controlling the phase shifter 520.

Referring to FIG. 6A, the antenna 600 according to an embodiment of the disclosure may be connected with the RFFE 610 through the first path 601. The antenna 600 may be connected with the phase shifter 520 through the second path 602 which is distinguished from the first path 601.

According to an embodiment of the disclosure, the phase shifter 520 may be electrically connected with a ground 470. According to another embodiment of the disclosure (not shown), the phase shifter 520 may be connected with an element having certain impedance. The element having the certain impedance according to an embodiment may be a reactance component that includes at least one of an open stub or a short stub according to the transmission line effect. The element having the certain impedance according to another embodiment may include a lumped element.

The RFFE 610 may include a transmitter (TX) path and a receiver (RX) path. The TX path and the RX path may be connected with the antenna 600.

Referring to FIG. 6B, an antenna structure according to an embodiment of the disclosure (e.g., the antenna module 500 of FIG. 5A) may include a first switch circuit 631 and a second switch circuit 632.

The first switch circuit 631 may be connected with the antenna 600 through a first path 601. The first switch circuit 631 may be connected with a first RFFE 611 and a first phase shifter 521. The antenna 600 may be electrically connected with the first RFFE 611 or the first phase shifter 521, selectively, by the first switch circuit 631 connected through the first path 601. The first RFFE 611 may include a first TX path and a first RX path. A second RFFE 612 may include a second TX path and a second RX path.

The first RFFE 611 or the first phase shifter 521 may be included in a first RFIC (not shown).

The second switch circuit 632 may be connected with the antenna 600 through a second path 602. The second switch 632 may be connected with the second RFFE 612 and a second phase shifter 522. The antenna 600 may be electrically connected with the second RFFE 612 or the second phase shifter 522, selectively, by the second switch circuit 632. The second RFFE 612 or the second phase shifter 522 may be included in a second RFIC (not shown).

At least one processor (not shown) may control the first switch circuit 631 and the second switch circuit 632. The at least one processor may control the first switch circuit 631 and the second switch circuit 632, such that the antenna 600 is electrically connected with the first RFFE 611 through the first path 601, and the antenna 600 is electrically connected with the second phase shifter 522 through the second path 602. In another example, the at least one processor may control the first switch circuit 631 and the second switch circuit 632, such that the antenna 600 is electrically connected with the first phase shifter 521 through the first path 601, and the antenna 600 is electrically connected with the second RFFE 612 through the second path 602. The first switch circuit 631 may electrically connect the antenna 600 with at least one of the first TX path, the first RX path, or the first phase shifter 521. In another example, the second switch circuit 632 may electrically connect the antenna 600 with at least one of the second TX path, the second RX path, or the second phase shifter 522.

According to an embodiment of the disclosure, the first switch circuit 631 and/or the second switch circuit 632 may include a single pole three throw (SP3T) switch. According to another embodiment of the disclosure (not shown), the first switch circuit 631 and/or the second switch circuit 632 may include a single switch circuit (e.g., a double pole double throw (DPDT) antenna), but is not limited thereto.

The first RFFE 611, the second RFFE 612, the first phase shifter 521, and the second phase shifter 522 may be included in one RFIC.

Referring to FIG. 6C, an antenna structure according to an embodiment of the disclosure (e.g., the antenna module 500 of FIG. 5A) may include a third switch circuit 633 and a fourth switch circuit 634.

The third switch circuit 633 may be connected with the antenna 600 through a first path 601. The third switch circuit 633 may be connected with a first phase shifter 521. The antenna 600 may be connected with a first RFFE 611, or the first RFFE 611 and the first phase shifter 521 by the third switch 633 connected through the first path 601.

The fourth switch circuit 634 may be connected with the antenna 600 through a second path 602. The fourth switch circuit 634 may be connected with a second phase shifter 522. The antenna 600 may be connected with a second RFFE 612, or the second RFFE 612 and the second phase shifter 522 by the fourth switch 634.

The first RFFE 611 may include a first TX path and a second RX path. The second RFFE 612 may include a second TX path and a second RX path.

At least one processor (not shown) may control the third switch circuit 633 and the fourth switch circuit 634. For example, when the antenna 600 is connected with the first RFFE 611 and the first phase shifter 521 through the first path 601, at least one processor may control the third switch circuit 633 and the fourth switch circuit 634, such that the antenna 600 is electrically connected with the second phase shifter 522 through the second path 602. When the antenna 600 is connected with the first phase shifter 521 through the first path 601, the at least one processor may control the third switch circuit 633 and the fourth switch 634, such that the antenna 600 is electrically connected with the second RFFE 612 and the second phase shifter 522 through the second path 602.

Referring to FIGS. 6D and 6E, an antenna 600 according to an embodiment of the disclosure may be connected with a first RFFE 611, a first tuner 651, and a second tuner 652 through a first path 601. The first RFFE 611 may be connected with a first RX path through the first tuner 651. The first RFFE 611 may be connected with a first TX path through the second tuner 652.

The antenna 600 may be connected with a second RFFE 612, a third tuner 653, and a fourth tuner 654 through a second path 602. According to an embodiment, the second RFFE 612 may be connected with a second RX path through the third tuner 653. The second RFFE 612 may be connected with second TX path through the fourth tuner 654.

Referring to FIG. 6E, an antenna 600 according to an embodiment may be connected with a first RFFE 611 and a second RFFE 612 through at least one separate switch 661, 662, 663, or 664.

The at least one separate switch 661, 662, 663, and 664 may be disposed in an RFIC (e.g., the RFIC 510 of FIG. 5A), but is not limited thereto and may be disposed outside the RFIC.

When the at least one separate switch 661, 662, 663, and 664 is disposed inside the RFIC, the at least one separate switch may be disposed between a Tx path and an Rx path, and the antenna 600, and may operate.

The antenna 600 may be connected with the first RFFE 611, a first tuner 651 and a first RX path through the first separate switch 661 of the first path 601. The antenna 600 may be connected with the first RFFE 611, a second tuner 652 and a first TX path through the second separate switch 662 of the first path 601.

The antenna 600 may be connected with the second RFFE 612, a third tuner 653 and a second RX path through the third separate switch 663 of the second path 602. The antenna 600 may be connected with the second RFFE 612, a fourth tuner 654 and a second TX path through the fourth separate switch 664 of the second path 602.

The first tuner 651 to the fourth tuner 654 may be disposed inside the RFIC (e.g., the RFIC 510 of FIG. 5A), but is not limited thereto. The first tuner 651 to the fourth tuner 654 may be disposed inside the RFIC, so that a size of the antenna is reduced compared to a size of a structure in which a tuner is separately disposed.

At least one processor may adjust impedance of a transmission or reception path of a signal by controlling the first tuner 651 to the fourth tuner 654. The at least one processor may adjust a frequency of a signal transmitted or received through the antenna 600 by controlling the first tuner 651 to the fourth tuner 654.

Figure 7A:
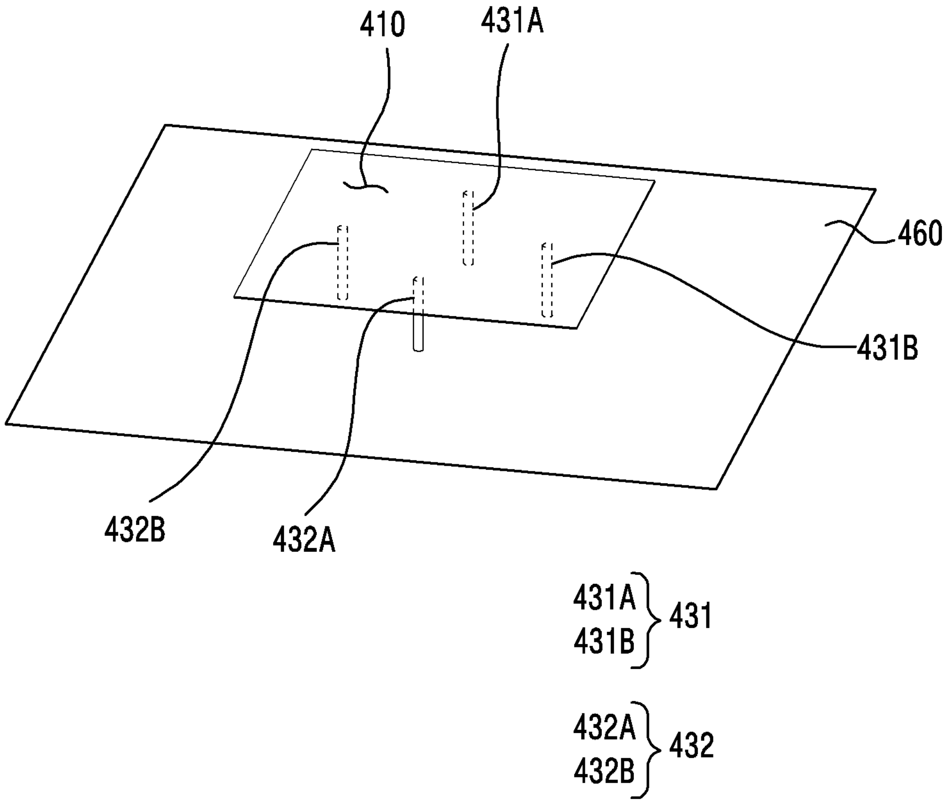
FIG. 7A is a view illustrating a conductive patch which is connected with a first via and a second via through which a vertical polarization and a horizontal polarization are transmitted or received according to an embodiment of the disclosure.
Figure 7B:
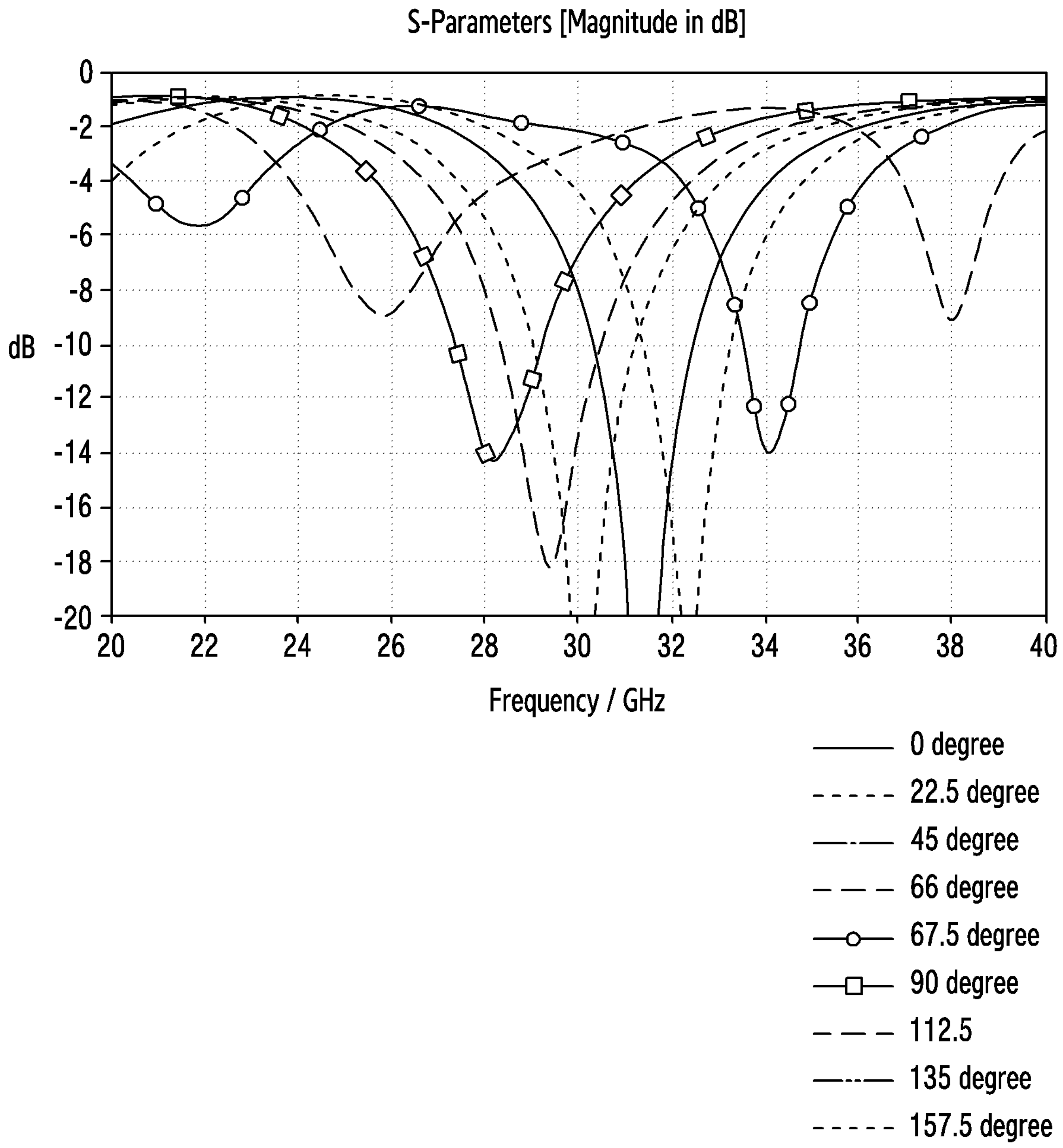
FIG. 7B is a view illustrating a resonance frequency according to a value of a phase shifter of a signal transmitted or received through an antenna according to an embodiment of the disclosure.

FIG. 7A illustrates a conductive patch which is connected with a first via and a second via through which a vertical polarization and a horizontal polarization are transmitted or received according to an embodiment of the disclosure. FIG. 7B illustrates a resonance frequency according to a value of a phase shifter of a signal which is transmitted or received through an antenna according to an embodiment of the disclosure.

Referring to FIG. 7A, a conductive patch 410 may be connected with a first via 431 and a second via 432. The conductive patch 410 may be electrically connected with a first layer 460 of a PCB (e.g., the PCB 530 of FIG. 5A) through the first via 431 and the second via 432. For the same components or substantially the same components as the above-described components, the same reference numerals may be used and a redundant explanation is omitted.

The first via 431 may transmit a signal for the conductive patch 410 to transmit or receive a signal (e.g., an mmWave signal) of a designated frequency band to the conductive patch 410.

According to an embodiment, the first via 431 may include a 1-1 via 431A or a 1-2 via 431B. For example, a signal that is fed to the conductive patch 410 through the 1-1 via 431A may be radiated with a first polarization. In another example, a signal that is fed to the conductive patch 410 through the 1-2 via 431B may be radiated with a second polarization which is orthogonal to the first polarization. For example, a signal that is provided from an RFFE (e.g., the RFIC 510 of FIG. 5A) may be radiated with a vertical polarization through the 1-1 via 431A. In another example, a signal that is provided from the RFFE (e.g., the RFIC 510 of FIG. 5A) may be radiated with a horizontal polarization through the 1-2 via 431B.

The second via 432 may include a 2-1 via 432A and a 2-2 via 432B. The 2-1 via 432A may change a frequency of a signal that is fed through the 1-1 via 431A. In another example, the 2-2 via 432B may change a frequency of a signal that is fed through the 1-2 via 431B.

Referring to FIG. 7B, a resonance frequency of a signal transmitted or received through the conductive patch 410 may be changed according to a value of a phase shifter (e.g., the phase shifter 520 of FIG. 5A) according to an embodiment.

For example, when the phase shifter has a phase value of 90 degrees, a signal that is transmitted or received through the conductive patch 410 may have a resonance frequency in a frequency band of about 28 GHz.

In another example, when the phase shifter has a phase value of 67.5 degrees, a signal that is transmitted or received through the conductive patch 410 may have a resonance frequency in a frequency band of about 34 GHz.

In another example, when the phase shifter has a phase value of 66 degrees, a signal that is transmitted or received through the conductive patch 410 may have a resonance frequency in a frequency of about 29.5 GHz.

However, a resonance frequency value of a signal which is changed according to a phase value of the phase shifter is not limited to the above-described examples, and may include various examples that can be understood based on the description of the drawings.

Figure 8A:
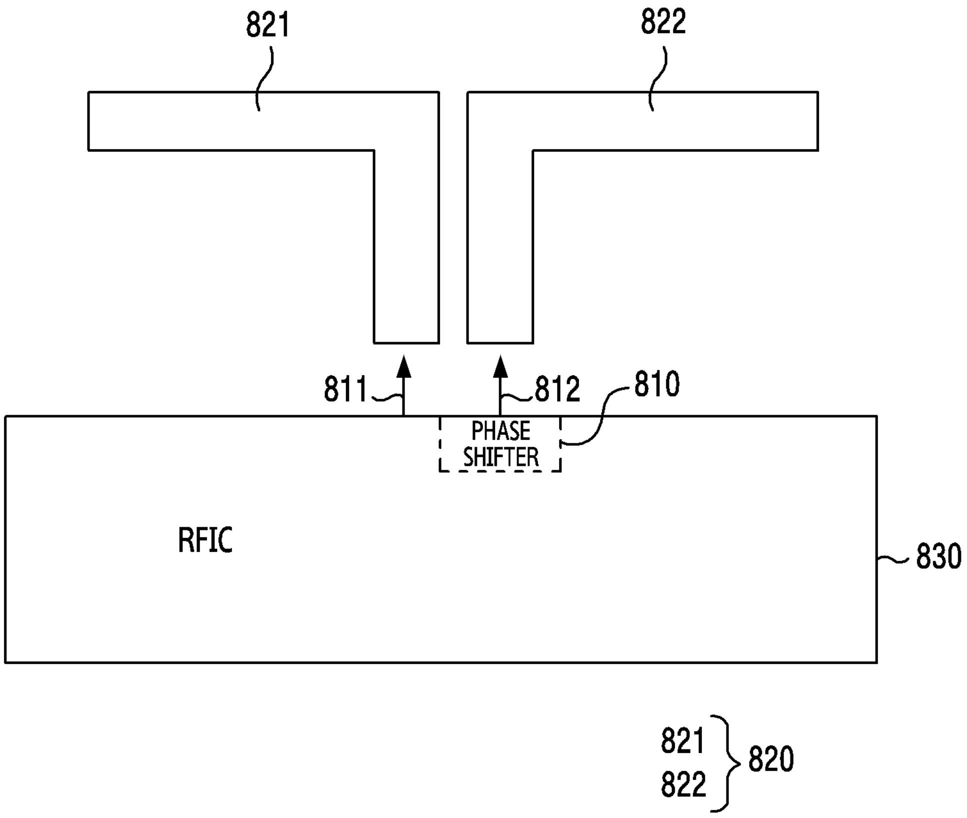
FIG. 8A is a view illustrating a structure of a dipole antenna according to an embodiment of the disclosure.
Figure 8B:
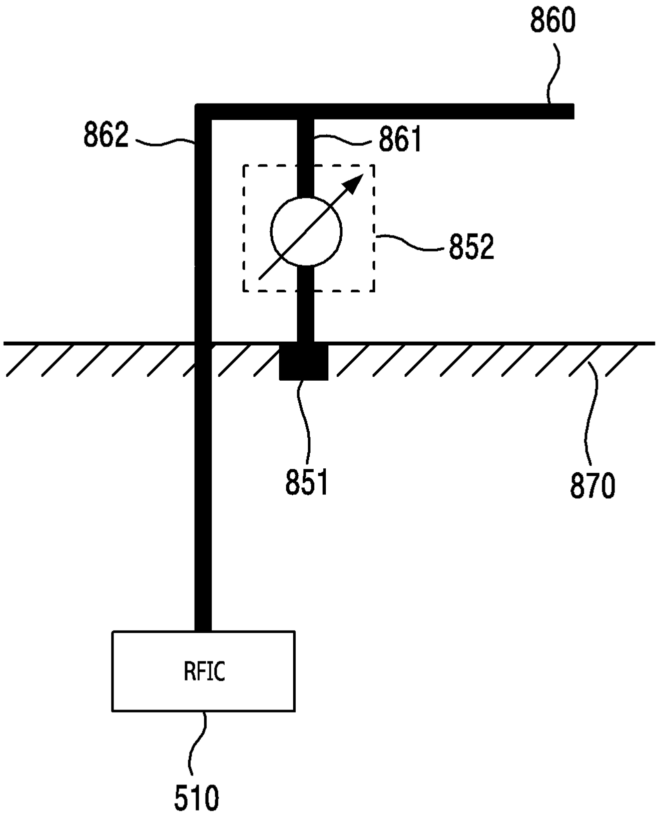
FIG. 8B is a view illustrating a structure of an inverted-F antenna according to an embodiment of the disclosure.

FIG. 8A illustrates a structure of a dipole antenna according to an embodiment of the disclosure. FIG. 8B illustrates a structure of an inverted-F antenna according to an embodiment of the disclosure.

Referring to FIGS. 8A and 8B, a phase shifter (e.g., the phase shifter 520 of FIGS. 5A to 5C) may be used as a tuner even in the dipole antenna 820 or the inverted-F antenna (IFA) 860.

Referring to FIG. 8A, the dipole antenna 820 may include a first radiator 821 and a second radiator 822. The first radiator 821 may be electrically connected with an RFIC 830 through a first path (or a first point) 811. The second radiator 822 may be electrically connected with a ground (e.g., the ground 470 of FIG. 5A) through a phase shifter 810 through a second path (or a second point) 812 which is distinguished from the first path 811.

According to an embodiment of the disclosure, the phase shifter 810 may be disposed inside the RFIC 830. According to another embodiment of the disclosure (not shown), the phase shifter 810 may be spaced apart from the RFIC 830, and may be electrically connected with the RFIC 830.

The RFIC 830 may feed power to the dipole antenna 820, thereby enabling the dipole antenna to transmit or receive a signal (e.g., an mmWave signal) of a designated frequency band (e.g., about 28 GHz). The RFIC 830 may adjust a resonance frequency of a signal which is transmitted or received through the dipole antenna 820, by controlling the phase shifter 810.

The first radiator 821 of the dipole antenna 820 may be connected with the RFIC 830 through the first path 811, and the second radiator 822 may be connected with the phase shifter 810 through the second path 812. The first path 811 and the second path 812 may be spaced apart from each other.

The structures of the RFIC 830 and the phase shifter 810 according to an embodiment of the disclosure may be referred to as the antenna structure 500 of FIG. 5A, but is not limited thereto.

Referring to FIG. 8B, the inverted-F antenna 860 may be electrically connected with an RFIC 851 through a second path (or a second point) 862. The inverted-F antenna 860 may be electrically connected with a phase shifter 852 through a first path (or a first point) 861 which is distinguished from the second path 862. The inverted-F antenna 860 may be electrically connected with a ground 870 (e.g., the ground 470 of FIG. 5A) through the phase shifter 852.

According to an embodiment of the disclosure, the phase shifter 852 may be disposed to be spaced apart from the RFIC 851, and may be electrically connected with the RFIC 851. According to another embodiment of the disclosure (not shown), the phase shifter 852 may be disposed inside the RFIC 851.

The RFIC 851 may feed power to the inverted-F antenna 860, thereby enabling the inverted-F antenna to transmit or receive a signal (e.g., an mmWave signal) of a designated frequency band (e.g., 28 GHz). The RFIC 851 may adjust a resonance frequency of a signal which is transmitted or received through the inverted-F antenna 860 by controlling the phase shifter 852 to.

The inverted-F antenna 860 may be connected with the RFIC 851 through the second path 862, and may be connected with the phase shifter 852 through the first path 861. The first path 861 and the second path 862 may be spaced apart from each other.

According to an embodiment of the disclosure, an antenna structure (e.g., the antenna module 500 of FIG. 5A) may include: a printed circuit board (PCB) (e.g., the PCB 530 of FIG. 5A) which includes a first surface (e.g., the first surface 530A of FIG. 5A) and a second surface (e.g., the second surface 530B of FIG. 5A) facing in an opposite direction to the first surface; a conductive patch (e.g., the conductive patch 410 of FIG. 5A) which is disposed on the first surface or inside the PCB adjacent to the first surface rather than the second surface; a first via (e.g., the first via 431 of FIG. 5A) which penetrates through at least part of the PCB and is connected with the conductive patch, and a second via (e.g., the second via 432 of FIG. 5A) which is spaced apart from the first via and is connected with the conductive patch; a radio frequency integrated circuit (RFIC)(e.g., the RFIC 510 of FIG. 5A) which is disposed on the second surface; and a phase shifter (e.g., the phase shifter 520 of FIG. 5A) which is disposed on the second surface or on the conductive patch to be electrically connected with the RFIC, or is disposed inside the RFIC, and the conductive patch may be connected with the RFIC through the first via, and may be connected with the phase shifter through the second via.

The RFIC may feed power to the conductive patch through the first via to transmit or receive a signal of a designated frequency band, and the signal may include an mmWave signal.

The designated frequency band may include 24 GHz to 43.5 GHz.

The antenna structure may include a connector which is disposed on the PCB, and the RFIC may control the phase shifter based on a control signal received through the connector.

The phase shifter may include at least one of a variable capacitor, an inductor, and an internal switch.

The RFIC may adjust a phase of the signal by controlling at least one of the variable capacitor, the inductor, and the internal switch of the phase shifter.

The antenna structure may include a ground disposed in the PCB, and the phase shifter may be electrically connected with the ground.

The conductive patch may be connected with the first via at a first point, and may be connected with the second via at a second point which is spaced apart from the first point, and a center of the conductive patch may be disposed to be positioned between the first point and the second point on a virtual axis connecting the first point and the second point.

When the phase shifter is disposed on the conductive patch, the phase shifter may be disposed at a center of the conductive patch.

The antenna structure may include an antenna array which is disposed on the first surface and includes a plurality of conductive patches.

According to an embodiment of the disclosure, an electronic device (e.g., the electronic device 101 of FIG. 1) may include: at least one processor (e.g., the processor 120 of FIG. 1) which is disposed in the electronic device; and an antenna module (e.g., the antenna module 500 of FIG. 5A) which is electrically connected with the at least one processor, and the antenna module may include: a printed circuit board (PCB) (e.g., the PCB 530 of FIG. 5A) which includes a first surface (e.g., the first surface 530A of FIG. 5A) and a second surface (e.g., the second surface 530B of FIG. 5A) which is parallel to the first surface; an antenna which is disposed on the first surface; a radio frequency integrated circuit (RFIC) (e.g., the RFIC 510 of FIG. 5A) which is disposed on the second surface and is electrically connected with the antenna; a phase shifter (e.g., the phase shifter 520 of FIG. 5A) which is electrically connected with the RFIC and is disposed inside the RFIC; and a switch circuit (e.g., the first switch circuit 631 of FIG. 6B) which is connected with the antenna, the RFIC, and the phase shifter, and the at least one processor may, when the antenna is connected with the RFIC at a first point, control the switch circuit such that the antenna is connected with the phase shifter at a second point which is spaced apart from the first point of the antenna; and, when the antenna is connected with the phase shifter at the first point, may control the switch circuit such that the antenna is connected with the RFIC at the second point.

The at least one processor may control the antenna to transmit or receive a signal of a designated frequency band, by feeding power to the antenna through the RFIC.

The electronic device may include a ground disposed in the PCB, and the phase shifter may be electrically connected with the ground.

The antenna module may include a connector disposed on the PCB, and may be electrically connected with the at least one processor through the connector.

The antenna module may receive a control signal from the at least one processor through the connector, and the at least one processor may control the phase shifter and the switch circuit through the control signal.

The phase shifter may include at least part of a variable capacitor, an inductor, and an internal switch, and the at least one processor may adjust a phase of the signal by controlling at least part of the variable capacitor, the inductor, and the internal switch through the control signal.

The antenna may include an array antenna including a plurality of antenna radiators.

The switch circuit may include a double pole double throw (DPDT) switch or a plurality of single pole double throw (SPDT) switches.

The antenna may include one of a dipole antenna (e.g., the dipole antenna 820 of FIG. 8A) or an inverted-F antenna (IFA) (e.g., the inverted-F antenna 860 of FIG. 8B).

The antenna module may include a first via (e.g., the first via 431 of FIG. 5A) penetrating through at least part of the PCB, and a second via (e.g., the second via 432 of FIG. 5A) spaced apart from the first via, and the switch circuit may be connected with the first point through the first via, and may be connected with the second point through the second via.

According to an embodiment of the disclosure, an antenna structure may include: a printed circuit board (PCB) which includes a first surface and a second surface facing in an opposite direction to the first surface; a conductive patch which is disposed on the first surface or inside the PCB adjacent to the first surface rather than the second surface; a ground which is disposed in the PCB; a first via which penetrates through at least part of the PCB and is connected with the conductive patch, and a second via which is spaced apart from the first via and is connected with the conductive patch; a radio frequency integrated circuit (RFIC) which is disposed on the second surface; and a phase shifter which is disposed on the second surface or on the conductive patch to be electrically connected with the RFIC, or is disposed inside the RFIC, and the conductive patch may be connected with the RFIC through the first via, and the phase shifter and the second via may be electrically connected between the conductive patch and the ground.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna structure comprising:

a printed circuit board (PCB) including a first surface and a second surface facing a direction opposite to the first surface;

a conductive patch disposed on the first surface or inside the PCB adjacent to the first surface;

a first via penetrating through at least part of the PCB and is connected with the conductive patch;

a second via spaced apart from the first via and is connected with the conductive patch;

a radio frequency integrated circuit (RFIC) which is disposed on the second surface;

a phase shifter disposed on the conductive patch to be electrically connected with the RFIC; and a ground disposed in the PCB, wherein the conductive patch is connected with the RFIC through the first via, and is electrically connected with the phase shifter through the second via, wherein the phase shifter is electrically connected to the ground through the second via, and wherein the conductive patch includes an opening for connecting the second via to the phase shifter.

2. The antenna structure of claim 1, wherein the RFIC is configured to feed power to the conductive patch through the first via to transmit or receive a signal of a designated frequency band, and wherein the signal comprises a millimeter wave (mm-Wave) signal.

3. The antenna structure of claim 2, wherein the designated frequency band includes 24 gigahertz (GHz) to 43.5 GHz.

4. The antenna structure of claim 2, wherein the phase shifter includes at least one of a variable capacitor, an inductor, or an internal switch.

5. The antenna structure of claim 4, wherein the RFIC is further configured to adjust a phase of the signal by controlling at least one of the variable capacitor, the inductor, or the internal switch of the phase shifter.

6. The antenna structure of claim 1, further comprising:
a connector disposed on the PCB,
wherein the RFIC is configured to control the phase shifter based on a control signal received through the connector.

7. The antenna structure of claim 1,
wherein the conductive patch is electrically connected with the first via at a first point and is connected with the second via at a second point spaced apart from the first point, and
wherein a center of the conductive patch is positioned between the first point and the second point on a virtual axis connecting the first point and the second point.

8. The antenna structure of claim 1, further comprising:
an antenna array disposed on the first surface and comprising a plurality of conductive patches.

9. The antenna structure of claim 1, wherein the second via is directly connected to the phase shifter.

10. The antenna structure of claim 1, wherein a first end of the phase shifter is connected to the conductive patch and a second end of the phase shifter is connected to the second via.

11. An antenna structure comprising:
a printed circuit board (PCB) including a first surface, a second surface facing a direction opposite to the first surface, and a ground disposed between the first surface and the second surface;
a conductive patch disposed on the first surface or inside the PCB adjacent to the first surface;
a radio frequency integrated circuit (RFIC) disposed on the second surface;
a phase shifter disposed on the conductive patch;
a first via penetrating through at least part of the PCB in which a first end of the first via is electrically connected with the conductive patch and a second end of the first via is electrically connected with the RFIC; and
a second via spaced apart and separate from the first via and electrically connected with the conductive patch,
wherein the phase shifter is disposed at a center of the conductive patch,
wherein the phase shifter is electrically connected to the ground through the second via, and
wherein the conductive patch includes an opening for connecting the second via to the phase shifter.

* * * * *